US010579827B2

(12) United States Patent
Telford et al.

(10) Patent No.: US 10,579,827 B2
(45) Date of Patent: Mar. 3, 2020

(54) EVENT PROCESSING SYSTEM TO ESTIMATE UNIQUE USER COUNT

(71) Applicant: Meltwater News International Holdings GmbH, Schaffhausen (CH)

(72) Inventors: Nicholas Telford, Reading (GB); Andi Miller, West Sussex (GB); Alistair Joseph Bastian, Surrey (GB)

(73) Assignee: Meltwater News International Holdings GmbH, Schaffhausen (CH)

( * ) Notice: Subject to any disclaimer, the term of this patent is extended or adjusted under 35 U.S.C. 154(b) by 115 days.

(21) Appl. No.: 15/657,859

(22) Filed: Jul. 24, 2017

(65) Prior Publication Data
US 2019/0026491 A1 Jan. 24, 2019

(51) Int. Cl.
*G06F 21/00* (2013.01)
*G06F 21/62* (2013.01)
*G06F 16/2458* (2019.01)
*G06F 16/2455* (2019.01)

(52) U.S. Cl.
CPC ...... *G06F 21/6254* (2013.01); *G06F 16/2474* (2019.01); *G06F 16/24568* (2019.01)

(58) Field of Classification Search
CPC ........... G06F 21/6254; G06F 16/24568; G06F 16/2474
See application file for complete search history.

(56) References Cited

U.S. PATENT DOCUMENTS

| 6,700,809 | B1* | 3/2004 | Ng | G11C 15/00 |
| | | | | 365/236 |
| 2013/0290065 | A1* | 10/2013 | Verdonk | G06Q 10/06 |
| | | | | 705/7.27 |
| 2014/0095472 | A1* | 4/2014 | Lee | G06F 16/24542 |
| | | | | 707/714 |
| 2016/0085810 | A1* | 3/2016 | de Castro Alves | ......... |
| | | | | G06F 16/24568 |
| | | | | 707/752 |
| 2017/0046342 | A1* | 2/2017 | Azgin | H04L 45/7453 |

(Continued)

OTHER PUBLICATIONS

"'Above the Trend Line'—Your Industry Rumor Central for Jan. 23, 2017," insideBIGDATA, Jan. 23, 2017, URL=https://insidebigdata.com/2017/01/23/above-the-trend-line-your-industry-rumor-central-for-1232017, download date Oct. 30, 2017, 4 pages.

(Continued)

*Primary Examiner* — Jeffrey C Pwu
*Assistant Examiner* — Rodman Alexander Mahmoudi
(74) *Attorney, Agent, or Firm* — Seed IP Law Group LLP

(57) ABSTRACT

User events are processed to estimate a unique user count. An identifier hash, having a bucket index portion denoting one of a plurality hash buckets, is generated for each of the user events. At a processing node, each of the user events is allocated to one of a plurality of processing threads based on the bucket index portion of its identifier hash. A unique user count is estimated as follows: for each user event satisfying at least one query parameter, 1) determine a run length of a second portion of its identifier hash, 2) compare it with a value of the hash bucket denoted by the bucket index portion of that identifier hash, and 3) if the determined run length is greater, change that hash bucket value at that node to match the determined run length. The hash bucket values are used to estimate the unique user count.

19 Claims, 18 Drawing Sheets

(56) References Cited

U.S. PATENT DOCUMENTS

2019/0004863 A1* 1/2019 Mainali ................ G06F 9/5061

OTHER PUBLICATIONS

"Acuerdo Entre Linkdin y Datasift Hace Más Publicitaria a Esta Red," ENTER.CO, Jan. 18, 2017, URL=http://www.enter.co/culturadigital/negocios/acuerdo-entre-linkdin-y-datasift-hace-mas-publicitaria-a-esta-red-social, download date Oct. 30, 2017, 5 pages (with English Machine Translation).
"Ad Roundup: Partnerships and a malware offer," BizReport, Jan. 23, 2017, URL=http://www.bizreport.com/2017/01/ad-roundup-partnerships-and-a-malware-offer.html, download date Oct. 30, 2017, 5 pages.
"Busting Brand Myths with Facebook Topic Data," DataSift, 32 pages.
"Cloud Dataflow: Simplified stream and batch data processing, with equal reliability and expressiveness," Google Cloud Platform, URL= https://cloud.google.com/dataflow, download date Oct. 30, 2017, 8 pages.
"Controversial New Facebook Analytics Tool Allows Marketers to Gather User Data Based on Topics," ContentStandard, Mar. 27, 2015, URL=https://www.skyword.com/contentstandard/marketing/controversial-new-facebook-analytics-tool-allows-marketers-to-gather-user-data-based-on-topics, download date Oct. 30, 2017, 4 pages.
"Count on Elasticsearch!," Elastic, Apr. 3, 2014, URL=https://www.elastic.co/blog/count-elasticsearch, download date Mar. 5, 2017, 4 pages.
"Crossing the Streams—Joins in Apache Kafka," codecentric Blog, Feb. 15, 2017, URL=https://blog.codecentric.de/en/2017/02/crossing-streams-joins-apache-kafka, download date Oct. 30, 2017, 9 pages.
Dalsass et al., "An eventful journey to real-time joins with Storm and Kafka," Criteo, 41 pages, 2012.
"DataSift and LinkedIn: a new angle for social media analytics," ZDNet, Jan. 24, 2017, URL=http://www.zdnet.com/article/datasift-and-linkedin-a-new-angle-for-social-media-analytics, download date Oct. 30, 2017, 12 pages.
"DataSift connects with LinkedIn as its latest social marketing partner," TechCrunch, Jan. 18, 2017, URL=https://techcrunch.com/2017/01/18/datasift-connects-with-linkedin-as-its-latest-social-marketing-partner, download date Oct. 30, 2017, 10 pages.
"DataSift offers first analysis at scale of how LinkedIn's members engage with content," Martech, Jan. 19, 2017, URL=https://martechtoday.com/datasift-offers-first-analysis-scale-linkedins-members-engage-content-194363, download dated Oct. 30, 2017, 5 pages.
"DataSift Partners with LinkedIn," CRM Magazine, Jan. 18, 2017, URL=http://www.destinationcrm.com/Articles/CRMNews/CRM-Across-the-Wire/DataSift-Partners-with-LinkedIn-115837.aspx, download date Oct. 30, 2017, 2 pages.
"DataSift Partners with LinkedIn, Launches PYLON for LinkedIn Engagement Insights," MarTech Advisor, Jan. 19, 2017, URL= https://www.martechadvisor.com/news/bi-ci-data-science/datasift-partners-with-linkedin-launches-pylon-for-linkedin-engagement-insights, download date Oct. 30, 2017, 6 pages.
"DataSift partners with LinkedIn to offer marketers with advanced insights into its user data," MSPoweruser, Jan. 18, 2017, URL= https://mspoweruser.com/datasift-partners-with-linkedin-to-offer-marketers-with-advanced-insights-into-its-user-data, download date Oct. 30, 2017, 15 pages.
"DataSift partners with LinkedIn to take marketer insights to the next level through AI," MarketingTech, Jan. 23, 2017, URL=https://www.marketingtechnews.net/news/2017/jan/23/datasift-partners-linkedin-take-marketer-insights-next-level-through-ai, download date Dec. 13, 2017, 6 pages.
"Di cosa parlano gli utenti su Facebook?," Wired, Mar. 23, 2015, URL=https://www.wired.it/internet/social-network/2015/03/23/cosa-dicono-utenti-facebook, download date Oct. 30, 2017, 7 pages (with English Machine Translation).
"Dissecting Facebook's Topic Data: What Consumers & Brands Need to Know," SocialMediaToday, Mar. 24, 2015, URL=https://www.socialmediatoday.com/socialnetworks/2015-03-24/dissecting-facebooks-topic-data-what-consumers-brands-need-know, download date Oct. 30, 2017, 3 pages.
"Distributed, Real-time Joins and Aggregations on User Activity Events using Kafka Streams," Confluent, Jun. 23, 2016, URL= https://www.confluent.io/blog/distributed-real-time-joins-and-aggregations-on-user-activity-events-using-kafka-streams, download date Oct. 30, 2017, 21 pages.
"Do You Care About What People Say About Your Brand on Facebook?," CMSWire, Mar. 26, 2015, URL=https://www.cmswire.com/cms/analytics/do-you-care-what-people-say-about-your-brand-on-facebook-028611.php, download date Oct. 30, 2017, 6 pages.
"Facebook announces Topic Data, a new way to learn what matters to your audience," Pulsar, Mar. 10, 2015, URL=http://www.pulsarplatform.com/blog/2015/facebook-releases-topic-data, download date Oct. 30, 2017, 3 pages.
"Facebook apre a selezionati advertiser la sua preziosa mole di dati," Programmatic Italia, Mar. 16, 2015, URL=http://www.programmatic-italia.com/facebook-apre-selezionati-advertiser-sua-preziosa-mole-dati/#xhtZ5BYHeGtR1WS7.97, download date Oct. 30, 2017, 3 pages (with English Machine Translation).
"Facebook Begins Providing Topic Data to Select Marketers," DrivingSales News, Mar. 11, 2015, URL=http://www.drivingsales.com/news/facebook-begins-providing-topic-data-to-select-marketers, download date Oct. 30, 2017, 4 pages.
"Facebook budet peredavat dannyye polzovateley storonnim kompaniyam," Ekonomika Sevodnia, Mar. 12, 2015, URL=https://rueconomics.ru/44642-facebook-budet-peredavat-dannyie-polzovateley-storonnim-kompaniyam, download date Oct. 30, 2017, 2 pages (with English Machine Translation).
"Facebook DataSift Gives Select Marketers Access to Big Topic Data," SocialMediaToday, Mar. 12, 2015, URL=https://www.socialmediatoday.com/social-networks/2015-03-12/facebook-datasift-gives-select-marketers-access-big-topic-data, download date Oct. 30, 2017, 3 pages.
"Facebook to Explain More About Your Activities to its Advertisers," The Next Digit, Mar. 11, 2015, URL=http://thenextdigit.com/18671/facebook-explain-activities-advertisers/, download date Oct. 30, 2017, 2 pages.
"Facebook Finally Lets its Firehose be Tapped for Marketing Insights Thanks to DataSift," TechCrunch, Mar. 10, 2015, URL= https://techcrunch.com/2015/03/10/facebook-topic-data/, download date Oct. 30, 2017, 8 pages.
"Facebook finally opens its data firehose to select advertisers," Mashable, Mar. 12, 2015, URL=http://mashable.com/2015/03/12/facebook-topic-data/#TQnIYjzNFZqN, download date Oct. 30, 2017, 5 pages.
"Facebook Inc. (FB) Is Copying Twitter Inc. Again," The Motley Fool, Mar. 20, 2015, URL=https://www.fool.com/investing/general/2015/03/20/facebook-inc-fb-is-copying-twitter-inc-again.aspx, download date Oct. 30, 2017, 4 pages.
"Facebook Inc to Tell Advertisers What Users Are Talking About," ValueWalk, Mar. 11, 2015, URL=http://www.valuewalk.com/2015/03/facebook-advertiser-what-user-talking/, download date Oct. 30, 2017, 3 pages.
"Facebook Inc (FB) Topic Data Service: Another Threat to Privacy?," TechInsider, Mar. 11, 2015, URL=http://www.techinsider.net/facebook-inc-fb-topic-data-service-another-threat-to-privacy/1120838.html, download date Oct. 30, 2017, 3 pages.
"Facebook Inc (FB) Unveils New Data Analysis Tool for Marketers," Insider Monkey, Mar. 12, 2015, URL=http://www.insidermonkey.com/blog/facebook-inc-fb-unveils-new-data-analysis-tool-for-marketers-340281/, download date Oct. 30, 2017, 3 pages.
"Facebook Introduces New Business Analytics Tool "Topic Data" with DataSift: Opens Doors for Marketers, Advertisers," Customs Today, Mar. 12, 2015, URL=http://www.customstoday.com.pk/

(56) References Cited

OTHER PUBLICATIONS facebook-introduces-new-business-analytics-tool-topic-data-with-datasift-opens-doors-for-marketers-advertisers-2/, download date Oct. 30, 2017, 2 pages.
"Facebook Introduces Topic Data," Adweek, Mar. 10, 2015, URL= http://www.adweek.com/digital/topic-data/, download date Oct. 30, 2017, 8 pages.
"Facebook Introduces Topic Data," SocialMediaToday, Mar. 12, 2015, URL=https://www.socialmediatoday.com/social-networks/2015-03-12/facebook-introduces-topic-data, download date Oct. 30, 2017, 2 pages.
"Facebook introduces 'Topic Data' to help marketers understand their target audience," The Drum, Mar. 11, 2015, URL=http://www.thedrum.com/news/2015/03/11/facebook-introduces-topic-data-help-marketers-understand-their-target-audience-0, download date Oct. 30, 2017, 2 pages.
"Facebook Introduces Topic Data: Learn What Your Audience is Discussing on Facebook," Search Engine Journal, URL=https://www.searchenginejournal.com/facebook-introduces-topic-data-see-what-your-audience-is-saying-about-various-subjects/127912/, download date Oct. 30, 2017, 2 pages.
"Facebook Lancia un Tool di Social Media Analysis," MarketingArena, Mar. 24, 2015, URL=https://www.marketingarena.it/2015/03/24/facebook-lancia-un-tool-di-social-media-analysis/, download date Dec. 27, 2017, 2 pages (with English Machine Translation).
"Facebook launches new analytics tool—'Topic Data,'" Uncover California, Mar. 13, 2015, URL=http://uncovercalifornia.com/content/23623-facebook-launches-new-analytics-tool-topic-data, download date Oct. 30, 2017, 2 pages.
"Facebook launches new data analysis tool to measure social conversations," wwwhat's new, Mar. 10, 2015, URL=https://wwwhatsnew.com/2015/03/10/facebook-lanza-nueva-herramienta-de-analisis-de-datos-para-medir-las-conversaciones-sociales/, download date Oct. 30, 2017, 3 pages.
"Facebook Launching New Product to Help Brands Get Feedback," TechFrag, URL=http://techfrag.com/2015/03/11/facebook-launching-new-product-help-brands-get-feedback/, download date Oct. 30, 2017, 2 pages.
"Facebook to let marketers see what people are talking about," Naked Security, Mar. 12, 2015, URL=https://nakedsecurity.sophos.com/2015/03/12/facebook-to-let-marketers-listen-in-on-what-people-are-talking-about/, download date Oct. 30, 2017, 3 pages.
"Facebook Lets Advertisers Eavesdrop on Your Conversations," Huffington Post, May 13, 2015, URL=https://www.huffingtonpost.com/entry/facebook-lets-advertisers_b_6867426.html, download date Oct. 30, 2017, 2 pages.
"Facebook Lets Marketers See What Users Talk About With Topic Data," ClickZ, Mar. 10, 2015, URL=https://www.clickz.com/facebook-lets-marketers-see-what-users-talk-about-with-topic-data/26897/, download date Dec. 27, 2017, 2 pages.
"Facebook letting advertisers take a deeper look at users' posts," CIO New Zealand, URL=https://www.cio.co.nz/article/570017/facebook-letting-advertisers-take-deeper-look-users-posts/, download date Oct. 30, 2017, 1 page.
"Facebook Looks to Compete with Twitter for Data Monetization," ETCentric, Mar. 16, 2015, URL=http://www.etcentric.org/facebook-looks-to-compete-with-twitter-for-data-monetization, download date Oct. 30, 2017, 2 pages.
"Facebook is Making its Firehose Available to Select Advertisers," iamwire, URL=http://www.iamwire.com/2015/03/facebook-making-firehose-select-advertisers/111852, download date Oct. 30, 2017, 1 page.
"Facebook to mine user data for marketers," IT News, Mar. 12, 2015, URL=https://www.itnews.com.au/news/facebook-to-mine-user-data-for-marketers-401574, download date Oct. 30, 2017, 2 pages.
"Facebook mines user data to become a market consultant," The Australian, Mar. 12, 2015, URL=http://www.theaustralian.com.au/business/wall-street-journal/facebook-mines-user-data-to-become-a-market-consultant/news-story, download date Oct. 30, 2017, 1 page.

"Facebook's new 'Topic Data' tells marketers what you talk about," SiliconANGLE, Mar. 11, 2015, URL=https://siliconangle.com/blog/2015/03/11/facebooks-new-topic-data-tells-marketers-what-you-talk-about/, download date Oct. 30, 2017, 2 pages.
"Facebook Now Provides Select Partners With In-Depth Topic Data," Web Marketing Pros, Mar. 13, 2015, URL=http://www.webmarketingpros.com/blog/facebook-now-provides-select-partners-with-in-depth-topic-data/, download date Oct. 30, 2017, 3 pages.
"Facebook to offer insights on what users are talking about," CNET, Mar. 10, 2015, URL=https://www.cnet.com/news/facebook-to-offer-insights-about-what-users-are-talking-about/, download date Oct. 30, 2017, 3 pages.
"Facebook Opens its Data Firehose," ResearchLive, Mar. 12, 2015, URL=https://www.researchlive.com/article/news/facebook-opens-its-data-firehose/id/4013026, download date Oct. 30, 2017, 2 pages.
"Facebook Opens its Own Private Firehose," datanami, Mar. 11, 2015, URL=https://www.datanami.com/2015/03/11/facebook-opens-its-own-private-firehose/, download date Oct. 30, 2017, 2 pages.
"Facebook Opens 'Topic Data' Firehose to Select Marketers," Marketing Land, Mar. 10, 2015, URL=https://marketingland.com/facebook-opens-topic-data-to-selected-marketers-120974, download date Oct. 30, 2017, 3 pages.
"Facebook opens up big data for select advertisers," ITProPortal, Mar. 12, 2015, URL=https://www.itproportal.com/2015/03/12/facebook-opens-big-data-select-advertisers/, download date Oct. 30, 2017, 2 pages.
"Facebook opens valve on data firehose," RetailDIVE, Mar. 10, 2015, URL=https://www.retaildive.com/news/facebook-opens-valve-on-data-firehose/373577/, download date Oct. 30, 2017, 2 pages.
"Facebook partners with Datasift to create more marketing intelligence," Infopresse, Mar. 10, 2015, URL=http://www.infopresse.com/article/2015/3/10/facebook-s-associe-avec-datasift-pour-creer-plus-d-intelligence-marketing, download date Oct. 30, 2017, 1 page.
"Facebook partners with DataSift of social data platform," CNET Japan, Mar. 11, 2015, URL=https://japan.cnet.com/article/35061607/, download date Oct. 30, 2017, 1 page.
"Facebook permitirá a los anunciantes ver qué es lo más popular," El Comercio, URL=https://elcomercio.pe/redessociales/facebook/facebook-permitira-anunciantes-ver-popular-341409, download date Oct. 30, 2017, 2 pages (with English Machine Translation).
"Facebook to Relay to Brands What Fans Talk About," Chiefmarketer, Mar. 10, 2015, URL=http://www.chiefmarketer.com/facebook-relay-brands-fans-talk/, download date Oct. 30, 2017, 1 page.
"Facebook reveals user data to a handful of advertising partners," Digital Journal, Mar. 18, 2015, URL=http://www.digitaljournal.com/technology/facebook-makes-big-data-available-to-select-marketers/article/428591, download date Oct. 30, 2017, 3 pages.
"Facebook to Sell Advertisers Info on Trending Topics," The Telecom Blog, Mar. 13, 2015, URL=https://www.thetelecomblog.com/2015/03/13/facebook-to-sell-advertisers-info-on-trending-topics/, download date Oct. 30, 2017, 1 page.
"Facebook shares users' conversations with marketers," The Tech Bulletin, Mar. 13, 2015, URL=http://www.thetechbulletin.com/facebook-shares-users-conversations-with-marketers-19432/, download date Oct. 30, 2017, 3 pages.
"Facebook is Sharing Your Conversations with Advertisers," Load the Game, Mar. 12, 2015, URL=http://www.loadthegame.com/2015/03/12/facebook-sharing-conversations-advertisers/, download date Oct. 30, 2017, 3 pages.
"Facebook's shiny new analysis tool lets marketers dive into customer data," ITPro, Mar. 11, 2015, URL=http ://www.itpro.co.uk/busine s sintelligence/24210/facebooks-shiny-new-analysis-tool-lets-marketers-dive-into-customer-data, download date Oct. 30, 2017, 2 pages.
"Facebook slammed after advertising funeral directors to a Cancer patient: Promotions appeared after sufferer Googled disease," Daily Mail Online, Mar. 11, 2015, URL=http://www.dailymail.co.uk/sciencetech/article-2989768/Facebook-slammed-advertising-funeral-directors-CANCER-patient-Promotions-appeared-sufferer-Googled-disease.html, download date Oct. 30, 2017, 5 pages.
"Facebook to Start Telling Brands Who's Talking About What Topics," AdAge, Mar. 10, 2015, URL=http://adage.com/print/297507, download date Dec. 13, 2017, 3 pages.

(56) References Cited

OTHER PUBLICATIONS

"Facebook Takes on New Role: Marketing Consultant," Wall Street Journal, Mar. 10, 2015, URL=https://www.wsj.com/articles/facebook-takes-on-new-role-marketing-consultant-1426036185, download date Oct. 30, 2017, 2 pages.
"Facebook Tells Marketers About What Users are Saying," WebProNews, Mar. 10, 2015, URL=https://www.webpronews.com/feed/, download date Oct. 30, 2017, 5 pages.
"Facebook Topic Data," Vimeo, URL=https://vimeo.com/167333071, download date Oct. 30, 2017, 1 page.
"Facebook's 'Topic Data' Adds Brainy to Brands," Inbound Authority, Mar. 16, 2015, URL=http://www.inboundauthority.com/uncategorized/facebooks-topic-data-adds-brainy-to-brands!, download date Oct. 30, 2017, 3 pages.
"Facebook's Topic Data is a Hot Topic," Adweek, Mar. 11, 2015, URL=http://www.adweek.com/digital/facebook-topic-data-reax/, download date Jan. 2, 2018, 5 pages.
"Facebook's Topic Data: New Initiative Could Help Marketers Get 'Holistic View' of Audiences," Mobile Advertising Watch, URL=http://mobileadvertisingwatch.com/facebooks-topic-data-new-initiative-could-help-marketers-get-holistic-view-of-audiences-16307, download date Oct. 30, 2017, 1 page.
"Facebook Topic Data to Offer New Insights to Marketers," Castleford, Mar. 10, 2015, URL=https://www.castleford.com.au/contentmarketingblog/facebook-topic-data-to-offer-new-insights-to-marketers, download date Oct. 30, 2017, 3 pages.
"Facebook's Topic Data tells advertisers what users are talking about," BizReport, Mar. 12, 2015, URL=http://www.bizreport.com/2015/03/facebooks-topic-data-tells-advertisers-what-users-are-talkin.html, download date Oct. 30, 2017.
"Facebook Turning Your News Feed Chatter Into Ad Dollars," PCMag UK, Mar. 11, 2015, URL=http://uk.pcmag.com/news/40339/facebook-turning-your-news-feed-chatter-into-ad-dollars, download date Oct. 30, 2017, 2 pages.
"Facebook will allow advertisers to follow conversations of their users," PCWorld, Mar. 11, 2015, URL=http://www.pcworldenespanol.com/2015/03/11/facebook-permitira-anunciantes-poder-ver-mas-fondo-las-publicaciones-de-sus-usuarios/, download date Oct. 30, 2017, 2 pages.
"Facebook will monitor our responses and provide feedback to advertisers," PCLab, Mar. 16, 2015, URL=http://pclab.pl/news62592.html, download date Oct. 30, 2017, 2 pages.
"Facebook Will Provide Audience Data for Marketer Insights," Wall Street Journal, Mar. 10, 2015, URL=https://blogs.wsj.com/cmo/2015/03/10/facebook-will-provide-audience-data-for-marketer-insights/, download date Oct. 30, 2017, 1 page.
"Facebook will provide information about users to marketing companies," ZN.ua, Mar. 12, 2015, URL=https://zn.ua/TECHNOLOGIES/facebook-budet-predostavlyat-informaciyu-o-polzovatelyah-marketingovym-kompaniyam-169598_.html, download date Oct. 30, 2017, 4 pages.
"Facebook will first see what users are talking about," Digitalic, Mar. 19, 2015, URL=https://www.digitalic.it/internet/social-network/facebook-fara-vedere-per-la-prima-volta-di-cosa-parlano-gli-utenti, download date Oct. 30, 2017, 1 page.
"Facebook will let advertisers know what their users are talking about," TransMedia.cl, Mar. 12, 2015, URL=http://www.transmedia.cl/noticia3=id120315.htm, download date Oct. 30, 2017, 1 page.
"Facebook Will Offer Marketing Consultancy," Trinity News Daily, Mar. 11, 2015, URL=https://www.trinitynewsdaily.com/facebook-will-offer-marketing-consultancy/1195/, download date Jan. 3, 2018, 2 pages.
"Facebook Will Tell Marketers What Users Are Saying," Top Tech News, Mar. 10, 2015, URL=https://www.toptechnews.com/article/index.php?story_id=022001TW1L30, download date Oct. 30, 2017, 2 pages.
"A First Look at Facebook Topic Data," Vimeo, URL=https://vimeo.com/126525535, download date Oct. 30, 2017, 3 pages (Screenshot Only).
"Five Things This Marketing Geek is Hoping for at F8 Facebook Developer Conference," Social Media Insider, Mar. 25, 2015, URL=https://www.mediapost.com/publications/article/246441/five-things-this-marketing-geek-is-hoping-for-at-f.html, download date Oct. 30, 2017, 3 pages.
Flajolet et al., "HyperLogLog: the analysis of a near-optimal cardinality estimation algorithm," *2007 Conference on Analysis of Algorithms*, 2007, pp. 127-146.
"Guest Column: Facebook in 2015 and The Road Ahead," PromaxBDA, Mar. 25, 2015, URL=http://briefpromaxbda.org/content/guest-column-facebook-in-2015-and-the-road-ahead, download date Oct. 30, 2017, 7 pages.
"How Can Marketers/Companies Benefit From Tapping Into Facebook Inc (FB) Data?," Insider Monkey, Mar. 12, 2015, URL=http://www.insidermonkey.com/blog/how-can-marketers-companies-benefit-from-tapping-into-facebook-inc-fb-data-340314/, download date Oct. 30, 2017, 3 pages.
"How IBM Will Help Brands Understand Tweets Better Using Analytics," TheStreet, Mar. 17, 2015, URL=https://www.thestreet.com/story/13080495/1/how-ibm-will-help-brands-understand-tweets-better-using-analytics.html, download date Oct. 30, 2017, 3 pages.
"IBM Introduces Twitter-Fueled Data Services for Business," The New York Times, Mar. 17, 2015, URL=https://bits.blogs.nytimes.com/2015/03/17/ibm-introduces-twitter-fueled-data-services-for-business/, download date Oct. 30, 2017, 3 pages.
"International Business Machines Corp. (NYSE:IBM) Moves Ahead of the Competition With Data Service Business From Twitter Inc (NYSE:TWTR)," US Markets Daily, URL=https://www.usmarketsdaily.com/international-business-machines-corp-nyseibm-moves-ahead-of-the-competition-with-data-service-business-from-twitter-inc-nysetwtr-10539, download date Oct. 30, 2017, 2 pages.
"Introducing Kafka Streams, the new stream processing library of Apache Kafka, Berlin Buzzwords 2016," SlideShare, Jun. 13, 2016, URL=https://www.slideshare.net/MichaelNoll4/introducing-kafka-streams-the-new-stream-processing-library-of-apache-kafka-berlin-buzzwords-2016, download date Oct. 30, 2017, 5 pages.
"Join: Storm in a Teacup," Adform, Nov. 17, 2015, URL=http://engineering.adform.com/blog/data/join-storm-in-a-teacup, download date Oct. 30, 2017, 10 pages.
"Kafka Streams—Not Looking at Facebook," Timothy Renner, Jan. 19, 2015, URL=https://timothyrenner.github.io/engineering/2016/08/11/kafka-streams-not-looking-at-facebook.html, download date Oct. 30, 2017, 7 pages.
"Learn What Matters to Your Audience: The Emergence of Topic Data on Facebook," Business 2 Community, Mar. 24, 2015, URL= http://www.business2community.com/facebook/learn-matters-audience-emergence-topic-data-facebook-01190392#j16pmDSIGgFuOVAb.97, download date Oct. 30, 2017, 3 pages.
Levitov, "Executive Summary and Technology Description," *Well Smart-Tech, LLC Strategic Business Plan*, Nov. 18, 2014, 8 pages.
"LinkedIn améliore ses capacités de ciblage publicitaire avec DataSift," Offremedia, URL=https://www.offremedia.com/linkedin-ameliore-ses-capacites-de-ciblage-publicitaire-avec-datasift, download date Oct. 30, 2017, 2 pages (with English Machine Translation).
"LinkedIn and DataSift Partner to Provide B2B Data Insights," Mobile Marketing, Jan. 19, 2017, URL=http://mobilemarketingmagazine.com/linkedin-datasift-partner-provide-b2b-data-insights, download date Oct. 30, 2017, 2 pages.
"LinkedIn debuts new desktop version with 'chatbots', new search and more," TechCrunch, Jan. 19, 2017, URL=https://techcrunch.com/2017/01/19/linkedin-desktop-update/, download date Oct. 30, 2017.
"LinkedIn Engagement Insights for Data-Driven Marketers," Website Magazine, Jan. 18, 2017, URL=https://www.websitemagazine.com/blog/linkedin-engagement-insights-for-data-driven-marketers, download date Oct. 30, 2017, 1 page.
"LinkedIn Gives Access to B-to-B Insights Through DataSift Deal," AdAge, Jan. 18, 2017, URL=http://adage.com/article/datadriven-marketing/linkedin-access-b-b-insights-datasift/307530/, download date Oct. 30, 2017, 5 pages.
"LinkedIn Launches Re-Vamped Desktop Experience," Social Media Today, Jan. 19, 2017, URL=https://www.socialmediatoday.com/

(56) References Cited

OTHER PUBLICATIONS social-business/linkedin-launches-re-vamped-desktop-experience, download date Oct. 30, 2017, 6 pages.
"LinkedIn partners with DataSift to offer more user data to advertisers," On MSFT, URL=https://www.onmsft.com/news/linkedin-partners-with-datasift-to-offer-more-user-data-to-advertisers, download date Oct. 30, 2017, 1 page.
"LinkedIn, più dati a disposizione delle aziende," Programmatic Italia, URL=http://www.programmatic-italia.com/linkedin-data-sift-piu-dati-per-le- aziende/#4MC6qfYm21ZOtcCa.97, download date Oct. 30, 2017, 3 pages (with English Machine Translation).
"LinkedIn renouvelle son interface bureau pour optimiser le networking," ITespresso, URL=http://www.itespresso.fr/linkedin-linterface-bureau-remise-au-gout-du-jour-146622.html?inf by=5a4d1452681db8470a8b492e, download date Oct. 30, 2017, 4 pages (with English Machine Translation).
"LinkedIn streamlines search in desktop revamp," Marketing Dive, Jan. 20, 2017, URL=https://www.marketingdive.com/news/linkedin-streamlines-search-in-desktop-revamp/434407/, download date Oct. 30, 2017, 2 pages.
"LinkedIn VP of Product Russ Glass on DataSift, Redesign," Twitter, Jan. 20, 2017, URL=https://twitter.com/cheddar/status/822545731538063365, download date Jan. 3, 2018 (screenshot of video only), 1 page.
"LinkedIn wants more ad dollars, so it's offering up more user data to advertisers," Recode, Jan. 18, 2017, URL=https://www.recode.net/2017/1/18/14308060/linkedin-datasift-partnership-advertising, download date Oct. 30, 2017, 3 pages.
"Marketers tap into Facebook," Fox Business Video, URL=http://video.foxbusiness.com/v/4105407057001, download date Oct. 30, 2017 (screenshot only), 1 page.
"Media Strategies for LinkedIn Engagement Insights," DataSift Developer Site, URL=https://dev.datasift.com/#redaction, download date Oct. 30, 2017, 2 pages.
"New Facebook data analysis tool shows marketers what their customers are talking about," VentureBeat, Mar. 10, 2015, URL=https://venturebeat.com/2015/03/10/new-facebook-data-analysis-tool-shows-marketers-what-their-customers-are-talking-about/, download date Oct. 30, 2017, 2 pages.
"New Facebook Marketing Tool Chews Up Data, Spits It Out," LinuxInsider, Mar. 17, 2015, URL=https://www.linuxinsider.com/story/81834.html, download date Oct. 30, 2017, 4 pages.
"New Facebook Service Helps Marketers Gauge Brand Appeal," Social Media & Marketing Daily, Mar. 10, 2015, URL=https://www.mediapost.com/publications/article/245355/new-facebook-service-helps-marketers-gauge-brand-a.html, download date Oct. 30, 2017, 2 pages.
"New LinkedIn Site Design Encourages Engagement," TechNewsWorld, Jan. 19, 2017, URL=https://www.technewsworld.com/story/84242.html, download date Oct. 30, 2017, 3 pages.
"Publicis, Dentsu and WPP Agencies are Getting Reams of New LinkedIn Ads Data," Adweek, URL=http://www.adweek.com/digital/publicis-dentsu-and-wpp-agencies-are-getting-reams-new-linkedin-ads-data-175615/, download date Oct. 30, 2017, 3 pages.
"Publicis, WPP y Dentsu se unen al acuerdo de LinkedIn y DataSift," Dircomfidencial, URL=https://dircomfidencial.com/internet/publicis-wpp-y-dentsu-se-unen-al-acuerdo-de-linkedin-y-datasift-20170123-0401/, download date Jan. 3, 2018, 3 pages (with English Machine Translation).
"'Pylon': Facebook launches new tool for target group acquisition," Social Media Advertising, Mar. 12, 2015 URL=https://www.wuv.de/digital/pylon_facebook_launcht_neues_tool_zur_zielgruppenerfassung, download date Oct. 30, 2017, 2 pages.
"PYLON for Facebook Topic Data," DataSift, URL=http://datasift.com/products/pylon-for-facebook-topic-data/, download date Oct. 30, 2017, 4 pages.
"PYLON for Facebook Topic Data FAQ," DataSift, URL=http://datasift.com/products/pylon-for-facebook-topic-data/faq, download date Oct. 30, 2017, 4 pages.
"PYLON for LinkedIn Engagement Insights," DataSift, URL=http://datasift.com/products/pylon-for-linkedin-engagement-insights/, download date Oct. 30, 2017, 4 pages.
"PYLON for LinkedIn Engagement Insights FAQ," DataSift, URL=http://datasift.com/products/pylon-for-linkedin-engagement-insights/faq, download date Oct. 30, 2017, 5 pages.
"La Revue du Lundi Par We Are Social #251," We Are Social, Mar. 17, 2015, URL=https://wearesocial.com/fr/blog/2015/03/la-revue-du-lundi-par-social-251, download date Oct. 30, 2017, 10 pages. (with English Machine Translation).
"Social media: The value of joining a 'community,'" Bury Free Press, Mar. 22, 2015, URL=http://www.buryfreepress.co.uk/news/opinion/social-media-the-value-of-joining-a-community-1-6645663, download date Oct. 30, 2017, 4 pages.
"Staying on the Right Side of the Fence when Analyzing Human Data," Vimeo, URL=https://vimeo.com/149068622, download date Oct. 30, 2017 (screenshot only), 1 page.
"Stream Processing Hard Problems Part II: Data Access," LinkedIn Engineering, Aug. 22, 2016, URL=https://engineering.linkedin.com/blog/2016/08/stream-processing-hard-problems-part-ii—data-access, download date Oct. 30, 2017, 9 pages.
"Topic Data: Learn What Matters to Your Audience," Facebook, Mar. 10, 2015, URL=https://www.facebook.com/business/news/topic-data, download date Oct. 30, 2017, 2 pages.
"Topic Data is a Marketer's Dream: Learn What Matters to Your Audience," The Media Beast, Mar. 19, 2015, URL=https://www.themediabeast.com/topic-data-is-a-marketers-dream-learn-what-matters-to-your-audience/, download date Oct. 30, 2017, 4 pages.
"Topic Data: a potential show prep gold mine," radioinfo, Mar. 17, 2015, URL=https://radioinfo.com.au/news/topic-data-potential-show-prep-gold-mine, download date Oct. 30, 2017, 1 page.
"Twitter's Video Move; Facebook Offers Topic Data," Ad Exchanger, Mar. 11, 2015, URL=https://adexchanger.com/ad-exchange-news/wednesday-03112015/, download date Oct. 30, 2017, 4 pages.
"Weekly Review (1) Mar. 4-Mar. 10," iThome, Mar. 14, 2015, URL=https://www.ithome.com/, download date Oct. 30, 2017, 5 pages.
"What Are Facebook Users Talking About? Advertisers Can Now Find Out," Recode, URL=https://www.recode.net/2015/3/10/11560028/facebook-topic-data-advertisers, download date Oct. 30, 2017, 3 pages.
"Why Facebook is Giving Away Some of its Best Data for Free," TheStreet, URL=https://www.thestreet.com/story/13077409/1/why-facebook-is-giving-away-some-of-its-best-data-for-free.html, download date Oct. 30, 2017, 2 pages.

* cited by examiner

EVENT PROCESSING SYSTEM TO ESTIMATE UNIQUE USER COUNT

TECHNICAL FIELD

The present invention relates to a system for processing events.

BACKGROUND

There are various contexts in which it is useful to extract aggregated and anonymized information relating to users of a platform.

For example, understanding what content audiences are publishing and consuming on social media platforms has been a goal for many for a long time. The value of social data is estimated at $1.3 trillion but most of it is untapped. Extracting the relevant information is challenging because of the vast quantity and variety of social media content that exists, and the sheer number of users on popular social media platforms, such as Facebook, Twitter, LinkedIn etc. It is also made even more challenging because preserving the privacy of the social media users is of the utmost importance.

A data platform that is available today under the name DataSift PYLON connects to real-time feeds of social data from various social media platforms (data sources), uncovers insights with sophisticated data augmentation, filtering and classification engine, and provides the data for analysis with an appropriate privacy protocol required by the data sources.

It allows insights to be drawn from posts, shares, re-shares, likes, comments, views, clicks and other social interactions across those social media platforms. A privacy-first approach is adopted to the social media data, whereby (among other things) results are exclusively provided in an aggregate and anonymized form that makes it impossible to identify any of the social media users individually.

In the context of event processing, the need arises in various contexts to analyze numbers of unique users on a platform—not only social media platforms where the events correspond to social interactions, but other types of platform with other types of user event.

SUMMARY

The "LogLog" family of cardinality estimation techniques provide efficient means of estimating a unique user count across a set of user events. An identifier of each user event is hashed, and a bucket index portion of the identifier hash is used to assign the user event to one of a set of hash buckets. The run length of a second portion of the identifier hash is determined and written to that hash bucket if it exceeds the current value. The unique user count can be estimated from the final hash bucket values with a variety of averaging methods.

A first aspect the invention provides a method of processing user events to estimate a unique user count, each of the user events having a user identifier, the method comprising: generating an identifier hash for each of the user events by applying a hash function to its user identifier, the identifier hash having a bucket index portion denoting one of a plurality hash buckets; at a processing node, allocating each of the user events to one of a plurality of processing threads of the processing node based on the bucket index portion of its identifier hash; receiving a query relating to the user events; and estimating at least one unique user count for the query by implementing the following steps: at the processing node, reserving a memory region for each of the hash buckets for storing values of the hash buckets at the processing node; processing, by each of the processing threads, each of the user events currently allocated to it, to determine whether the user event satisfies at least one parameter of the query, and if so: 1) determining a run length of a second portion of its identifier hash, 2) comparing, with the determined run length, a value, stored at the processing node, of the hash bucket denoted by the bucket index portion of that identifier hash, and 3) if the determined run length is greater, changing that hash bucket value at that node to match the determined run length; and using the hash bucket values to estimate the unique user count.

Allocating the user events to the processing threads based on the bucket index portion in this manner allows the unique user count to be estimated with particular efficiency in terms of the memory requirements at the processing node. This is discussed in greater detail below, in relation to the described embodiments.

This is particularly beneficial when multiple counts are estimated in response to a single query and, to this end, in embodiments a unique user count may be estimated for each of a plurality of user buckets indicated by the query, with said steps being implemented for each of the user buckets to generate the unique user count for that user bucket with the processing step being performed to determine whether that user event falls in that user bucket.

The memory regions may be reserved dynamically for the user buckets at the processing node as the user buckets are discovered, each user bucket being discovered the first time a user event falling in that user bucket is encountered.

Ordinals may be dynamically assigned to the user buckets as the user buckets are discovered, the ordinal assigned to a user bucket being associated with the memory regions reserved for that user bucket.

Each processing thread may dynamically assign ordinals to the user buckets independently of the other processing thread(s).

At least one array of container elements may be created in memory at the processing node for holding the hash bucket values, wherein the memory regions may be reserved dynamically in the memory by adding new container elements to the at least one array to grow the at least one array as the user buckets are discovered.

The array may be a shared array shared between the processing threads, or multiple arrays may be created which are individually owned by particular processing threads.

At least one master array may be created in memory at the processing node, the master array being an array of partitioned arrays, each of the partitioned arrays being an array of container elements for holding values of a subset of the hash buckets. At each processing thread, each time a user bucket is discovered, the processing thread may select one of the partitioned arrays in the master array based on the bucket index portion of that user event's identifier hash, the value of the hash bucket denoted by the bucket index portion of that identifier hash being stored in the selected partitioned array.

Each of the partitioned arrays may have a partition index within the master array, wherein the partitioned array may be selected by applying a function to the bucket index portion of the user event's identifier hash to determine the partition index of the selected partition array in the master array.

The memory regions may be reserved dynamically for the user buckets by growing the partitioned arrays as the user buckets are discovered, the partitioned arrays being grown by: each time a user bucket is discovered, selecting one of the partitioned arrays for growing based on the bucket index portion of the identifier hash of the first user event encountered in that user bucket and growing that selected partitioned array by adding at least one new container element to it.

Each processing thread may create its own local master array of partitioned arrays, which that processing thread grows independently of the other processing thread(s) as it discovers user buckets in processing the user events currently allocated to it.

Each processing thread may dynamically assign ordinals to the user buckets as it discovers them, independently of the other processing thread(s).

The local master arrays may be merged to generate at least one merged array of arrays, which is used to estimate the unique user counts for the user buckets.

Alternatively, the master array of partitioned arrays may be shared between the processing threads.

Another aspect of the invention is directed to a method of processing user events to estimate a unique user count, the method comprising: receiving the user events at a data processing stage, each of the user events having a user identifier; routing each of the received user events to one of a plurality of processing nodes of the data processing stage; generating an identifier hash for each of the user events by applying a hash function to its user identifier, the identifier hash having a bucket index portion denoting one of a plurality hash buckets; wherein the steps disclosed above in relation to the processing node are implemented at each processing node, and the resulting hash bucket values across the processing nodes are used to estimate the unique user count. This may involve merging the hash bucket values for each hash buckets across the nodes and using the merged values to estimate the count.

The user events may be routed to the processing nodes independently of the identifier hashes, whereby user events received at the data processing stage having matching identifier hashes may be routed to different processing nodes.

Another aspect of the invention is directed to a method of processing user events, each of the user events having a user identifier, the method comprising: generating an identifier hash for each of the user events by applying a hash function to its user identifier, the identifier hash denoting one of a plurality hash buckets; at a processing node, allocating each of the user events to one of a plurality of processing threads of the processing node based on its identifier hash; and processing, by each of the processing threads, each of the user events currently allocated to it, to determine whether to modify a value, stored at the processing node, of the hash bucket denoted by its identifier hash.

Another aspect of the invention is directed to an event processing system comprising: at least one processing node configured to receive user events and allocate each of those user events to one of a plurality of processing threads of the processing node based on a bucket index portion of an identifier hash generated for that user event, the bucket index portion denoting one of a plurality hash buckets; a hashing component configured to generate the identifier hash for each of the user events by applying a hash function to a user identifier of that user event; a query handler configured to receive a query relating to the user events; wherein the event processing system is configured to estimate at least one unique user count for the query by implementing any of the steps disclosed herein.

Another aspect of the invention is directed to a computer program product for processing user events to estimate a unique user count, each of the user events having a user identifier, the computer program product comprising computer readable instructions stored in computer readable storage, which are configured, when executed, to perform any of the steps disclosed herein.

BRIEF DESCRIPTION OF FIGURES

For a better understanding of the present invention, and to show how embodiments of the same may be carried into effect, reference is made by way of example to the following figures in which.

DETAILED DESCRIPTION OF EMBODIMENTS

Figure 1A:
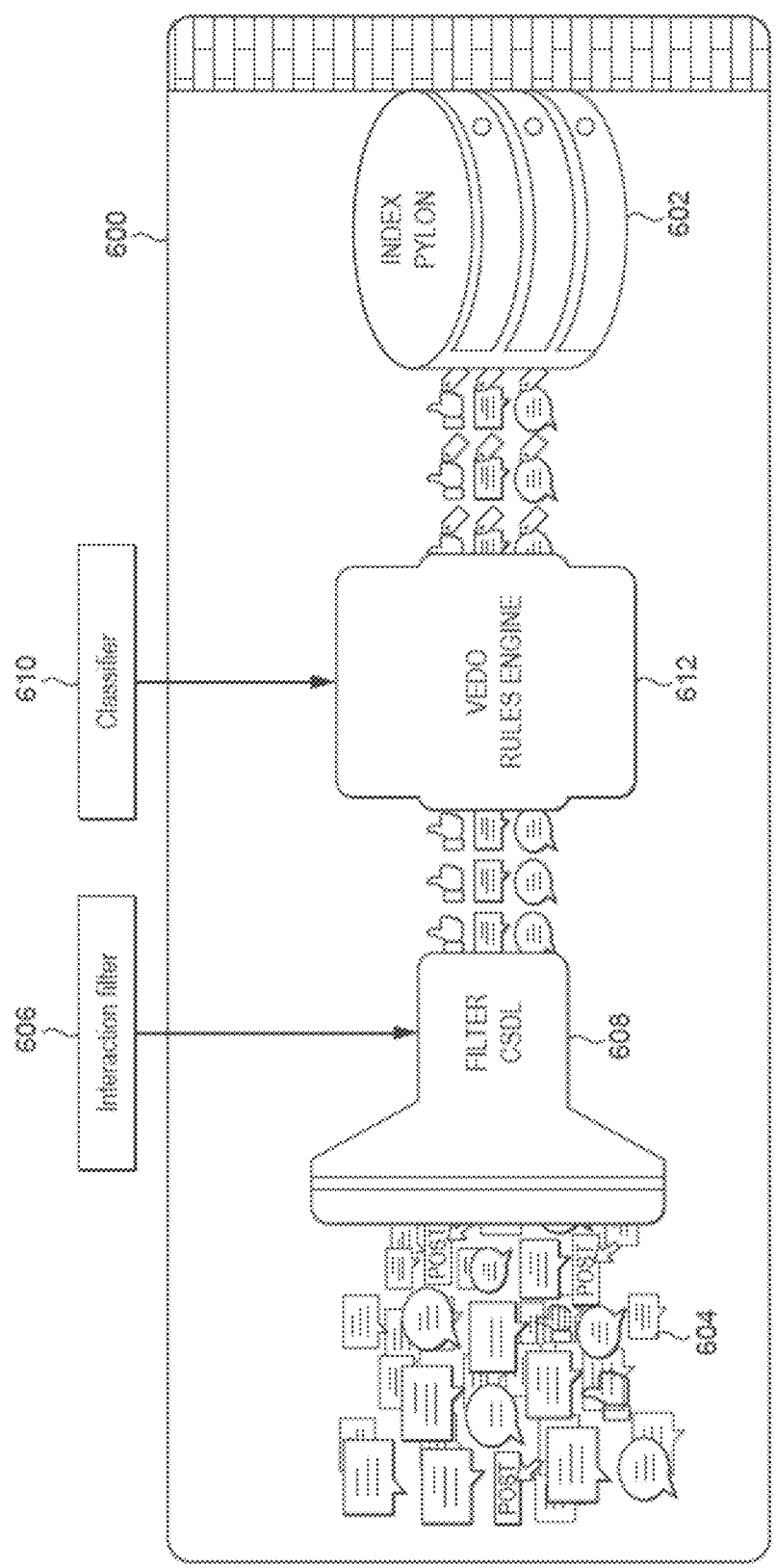
FIG. 1A shows a schematic block diagram of an index builder of a content processing system.

FIG. 1A shows a high level overview of part of a content processing system for processing content items 604 of a social media platform.

Each of the content items 604—also called "interaction events" or simply "events" herein—is a user event recording an "interaction" on the social media platform (social interaction), which can be a social media user publishing a new piece of content or consuming an existing piece of content. Examples of different publishing or consuming actions are given later. The events are provided by the social media platform, which is referred to as a "data provider" in this context. They are provided as a real-time data stream or multiple real-time data streams (e.g. different streams for different types of events), also referred to as "firehoses" herein. That is, the events 604 are received in real-time at an index builder 600 of the content processing system as the corresponding social interactions take place.

Indexes, such as index 602, can be created within the index builder 600. An index is a database in which selectively-made copies of the events 602 are stored for processing. An index can for example be a bespoke database created by a querying user for his own use, i.e. a user of the content processing system who wishes to submit queries to it (such as a customer), or it can be a shared index created by an operator of the content processing system for use by multiple customers. The index 602 holds copies of selected events 604, which are selected by a filtering component 608 of the index builder 600 according to specified filtering rules. These filtering rules are defined in what is referred to herein as an "interaction filter" 606 for the index 602. Viewed in slightly different terms, an index can be seen as a partial copy of a global database (the global database being the set of all events received from the data provider) that is populated by creating copies of the events 604 that match the interaction filter 606.

The index 602 can be created in a "recording" process, which is initialized by providing an interaction filter 606 and which runs from a timing of the initialization to capture events from that point onwards as they occur in real-time. It may also be possible for an index to contain historical events. The interaction filter 608 is applied by the filtering component 608 in order to capture events matching the interaction filter 606, from the firehoses, as those events become available. The process is a real-time process in the sense that it takes as an input the "live" firehoses from the data provider and captures the matching events in real-time as new social interactions occur on the social media platform. The recording process continues to run until the customer 606 (in the case of a bespoke index) or service provider (in the case of a shared index) chooses to suspend it, or it may be suspended automatically in some cases, for example when system limits imposed on the customer are breached.

Each of the events 604 comprises a user identifier of the social media user who has performed the corresponding interaction. As explained in further detail later, by the time the events 604 arrive at the filtering component 608, preferably every one of the events comprises a copy of the content to which it relates; certain "raw" events, i.e. as provided by the data provider, may not include the actual content when first provided, in which case this can be obtained and added in an "augmentation" stage of the content processing system, in which "context building" is performed.

User attributes of the social media users are made available by the data provider from user data of the social media platform, for example from the social media users' social media accounts (in a privacy-sensitive manner—see below). A distinguishing characteristic of such user attributes is that they are self-declared, i.e. the social media users have declared those attributes themselves (in contrast to user attributes that need to be inferred from, say, the content itself). The attributes be provided separately from the raw events representing the publication and consumption of content from the data provider. For example, an attribute firehose may be provided that conveys the creation or modification of social media profiles in real-time. In that case, as part of the context building, the events 604 relating to the publication and consumption of content can be augmented with user attributes from the attribute firehose, such that each of the augmented events 604 comprises a copy of a set of user attributes for the social media user who has performed the interaction.

The idea behind context building is to add context to events that lack it in some respect. For example, a user identifier (ID) in an incoming event may simply be an anonymized token (to preserve user privacy) that has no meaning in isolation; by adding user attributes association. In database terminology, context building can be viewed a form of de-normalization (vertical joining). Another example when a data provider provides a separate firehoses of "likes" or other engagements with previous events.

The customer or service provider is not limited to simply setting the parameters of his interaction filter 606; he is also free to set rules by which the filtered events are classified, by a classification component 612 of the index builder 600. That is, the customer/service provider has the option to create a classifier 610 defining classification rules for generating and attaching metadata to the events before they are stored in the index 602. These classification rules can, for example, be default or library rules provided via an API of the content processing system, or they can be rules which the customer or service codes himself for a particular application.

Individual pieces of metadata attached to the events 604 are referred to herein as "tags". Tags can include for example topic indicators, sentiment indicators (e.g. indicating positive, negative or neutral sentiment towards a certain topic), numerical scores etc., which the customer or service provider is free to define as desired. They could for example be rules based on simple keyword classification (e.g. classifying certain keywords as relating to certain topics or expressing positive sentiment when they appear in a piece of content; or attributing positive scores to certain keywords and negative scores to other keywords and setting a rule to combine the individual scores across a piece of content to give an overall score) or using more advanced machine learning processing, for example natural language recognition to recognize sentiments, intents etc. expressed in natural language or image recognition to recognize certain brands, items etc. in image data of the content. The process of adding metadata tags to events, derived from the content to which they relate, is referred to as "enrichment" below.

In addition to bespoke tags added through enrichment, the events may already have some tags when they are received in the firehoses, for example time stamps indicating timings of the corresponding interactions, geolocation data etc.

With the (additional) tags attached to them in this manner according to the customer's bespoke definitions, the filtered and enriched events are stored in the index 602, populating it over time as more and more events matching the interaction filter 608 are received.

Multiple indexes can be created in this manner, tailored to different applications in whatever manner the service provider/customers desire.

It is important to note that, in the case of private social media data in particular, even when the customer has created the index 602 using his own rules, and it is held in the content processing system on his behalf, he is never permitted direct access to it. Rather, he is only permitted to run controlled queries on the index 602, which return aggregate information, derived from its contents, relating to the publication and/or consumption of content on the content publication platform. The aggregate information released by the content sharing system is anonymized i.e. formulated and released in a way that makes it impossible to identify individual social media users. This is achieved in part in the way the information is compiled based on interaction and unique user counts (see below) and in part by redacting information relating to only a small number of users (e.g. less than one hundred).

Queries are discussed in greater detail below but for now suffice it to say that two fundamental building blocks for the anonymized aggregate information are:

1) interaction counts, and
2) associated unique user counts.

These counts can be generated either for the index 602 as a whole or (in the majority of cases) for a defined subset of the events in the index 602, isolated by performing further filtering of the events held in the index 602 according to "query filters" as they are referred to herein. Taken together, these convey the number of interactions per unique user for the (sub)set of events in question, which is a powerful measure of overall user behaviour for the (sub)set of events in question.

The interaction count is simply the number of events in the index 306 or subset, and the unique user count is the number of unique users across those events. That is, for a query on the whole index 602, the number of events that satisfy (match) the index's interaction filter 606 and the number of unique social media users who collectively performed the corresponding interactions; for a query on a subset of the index 602 defined by a query filter(s), the interaction count is the number of events that also match that query filter(s) (e.g. 606a, 606b, FIG. 1B—see below) and the number of unique social media users who collectively performed the corresponding subset of interactions. Successive query filters can be applied, for example, to isolate a particular user demographic or a particular set of topics and then breakdown those results into "buckets". Note, this does not mean successive queries have to be submitted necessarily; a single query can request a breakdown or breakdowns of results, and the layers of filtering needed to provide this breakdown can all be performed in response to that query. For example, results for a demographic defined in terms of gender and country could be broken down as a time series (each bucket being a time interval), or in a frequency distribution according to gender, most popular topics etc. These results can be rendered graphically on user interface, such as a dashboard, in an intuitive manner. This is described in greater detail later.

For example, to aggregate by gender (one of "Male", "Female", "Unknown") and age range (one of "18-25", "25-35", "35-45", "45-55", "55+"), in the response to an aggregation query (unique user and interaction) counts may be generated for each of the following buckets:
Bucket
Male, 18-25
Male, 25-35
Male, 35-45
Male, 45-55
Male, 55+
Female, 18-25
Female, 25-35
Female, 35-45
. . .
Unknown, 55+

Despite their simplicity, these fundamental building blocks are extremely powerful, particularly when coupled with the user attributes and bespoke metadata tags in the enriched events in the index 602. For example, by generating interaction and user counts for different subsets of events in the index 602, which are isolated by filtering according to different combinations of user attributes and tags, it is possible for an external customer to extract extremely rich information about, say, the specific likes and dislikes of highly targeted user demographics (based on the social interactions exhibited across those demographics) or the most popular topics across the index or subset thereof, without ever having to permit the external customer direct access to the index 602 itself.

For example, a useful concept when it comes to identifying trends within particular user demographics is the concept of "over-indexing". This is the notion that a particular demographic is exhibiting more interactions of a certain type than average. This is very useful when it comes to isolating behaviour that is actually specific to a particular demographic. For example, it might be that within a demographic, a certain topic is seeing a markedly larger number of interactions per unique user than other topic (suggesting that users are publishing or consuming content relating to that topic more frequently). However, it might simply be that this is a very popular topic, and that other demographics are also seeing similar numbers of interactions per unique user. As such, this conveys nothing specific about the target demographic itself. However, where, say, a topic is over-indexing for a target user demographic, i.e. seeing a greater number of interactions per unique user across the target demographic than the number of interactions per unique user across a wider demographic, then that coveys information that is specific to the target demographic in question.

Figure 1B:
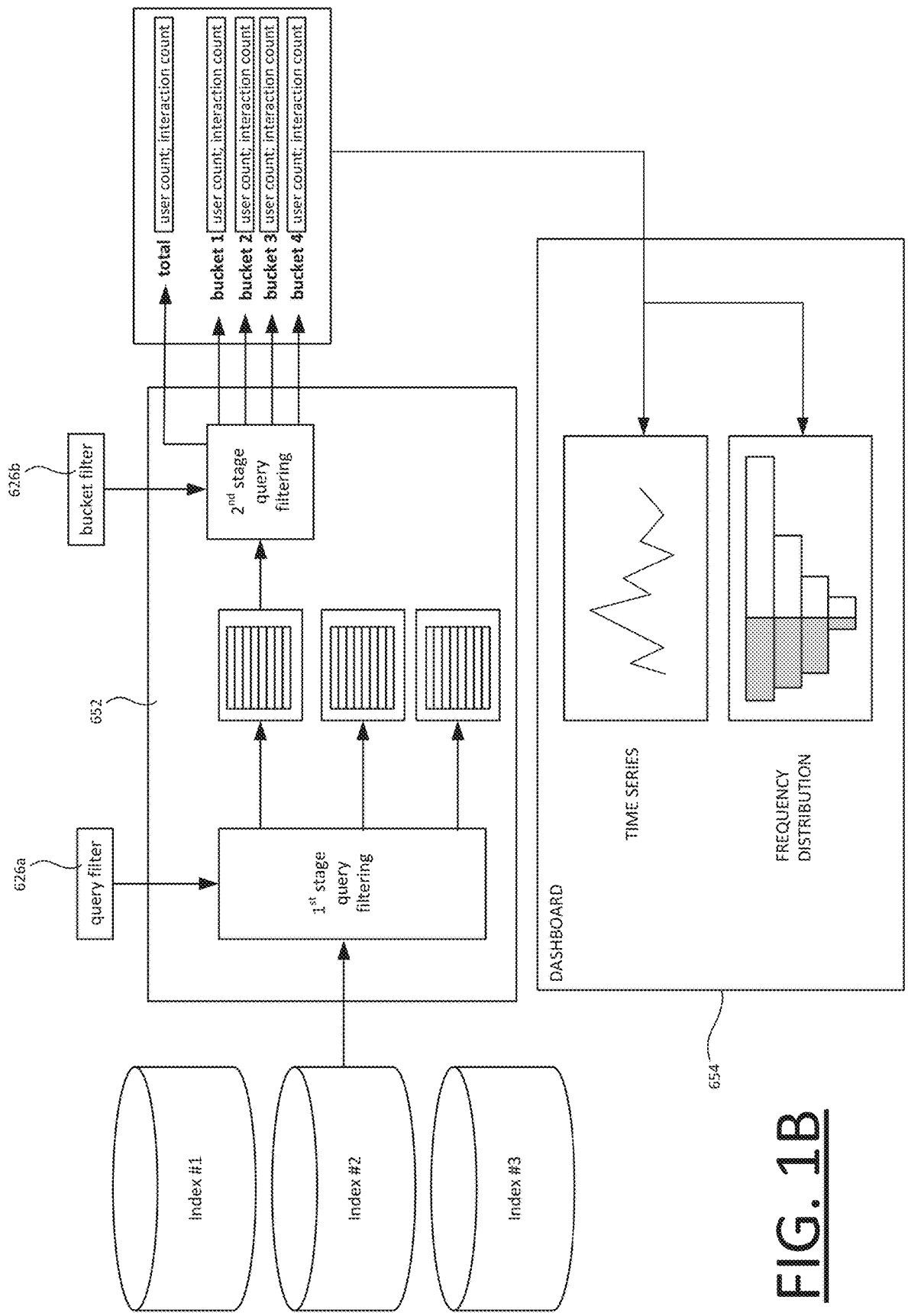
FIG. 1B shows a schematic block diagram of a real-time filtering and aggregation component of a content processing system.

By way of example, FIG. 1B shows a real-time filtering and aggregation component 652 of the content processing system implementing steps to respond to a query with two stages of filtering to give a breakdown in response to that query.

In the first stage of filtering 654a, a first query filter 626a is applied to the index 602 (shown as one of multiple indexes) to isolate a subset of events 656 that match the first query filter 626a. The first query filter 626a can for example be defined explicitly in the query by the customer, in order to isolate a particular demographic(s) of users of a particular topic(s) (or a combination of both) that is of interest to him.

In the second state of filtering 654b, second query filters 262b (bucket filters) are applied to the subset of events 656. Each of the bucket filters is applied to isolate the events in the subset 656 that satisfy that bucket filter, i.e. the events in a corresponding bucket, so that total interaction and user counts can be computed for that bucket. The total user and interaction counts for each bucket (labelled 656.1-4 for buckets 1-4 in this example) are included, along with total user and interaction counts for the subset of events 656 as a whole, in a set of results 660 returned in response to the query. The results 660 are shown rendered in a graphical form on a user interface, which is a dashboard 654. That is, the result 660 is represented as graphical information displayed on a display to the customer. The underlying set of results 660 can also be provided to the customer, for example in a JSON format, so that he can apply his own processing to them easily.

Multiple subsets can be isolated in this way at the first stage filtering 626a, and each can be broken down into buckets as desired at the second stage 626b.

The buckets can for example be time based, i.e. with each bucket containing events in the subset 656 within a different time interval. These are shown rendered on the dashboard 654 as a graphical time series 655a, with time along the x-axis and the counts or a measure derived from the counts (such as number of interactions per unique user) on the y-axis, which is a convenient and intuitive way of representing the breakdown according to time. As another example, the buckets could be topic based (e.g. to provide a breakdown of the most popular topics in the subset 656) or user based (e.g. to provide a breakdown according to age, gender, location, job function etc.), or a combination of both. In this case, it may be convenient to represent the results as a frequency distribution or histogram 655b, to allow easy comparison between the counts or a measure derived from the counts (e.g. interactions per user) for different buckets. As will be appreciated, these are just examples, and it possible to represent the results for the different buckets in different ways that may be more convenient in some contexts. The information for each bucket can be displayed alongside the equivalent information for the subset 656 as a whole for comparison, for example by displaying on the dashboard 654 the total user and interaction counts or the total number of interactions per unique user across the subset 656 as a whole etc. The dashboard 654 can for example provided as part of a Web interface accessible to the customer via the Internet.

Figure 2:
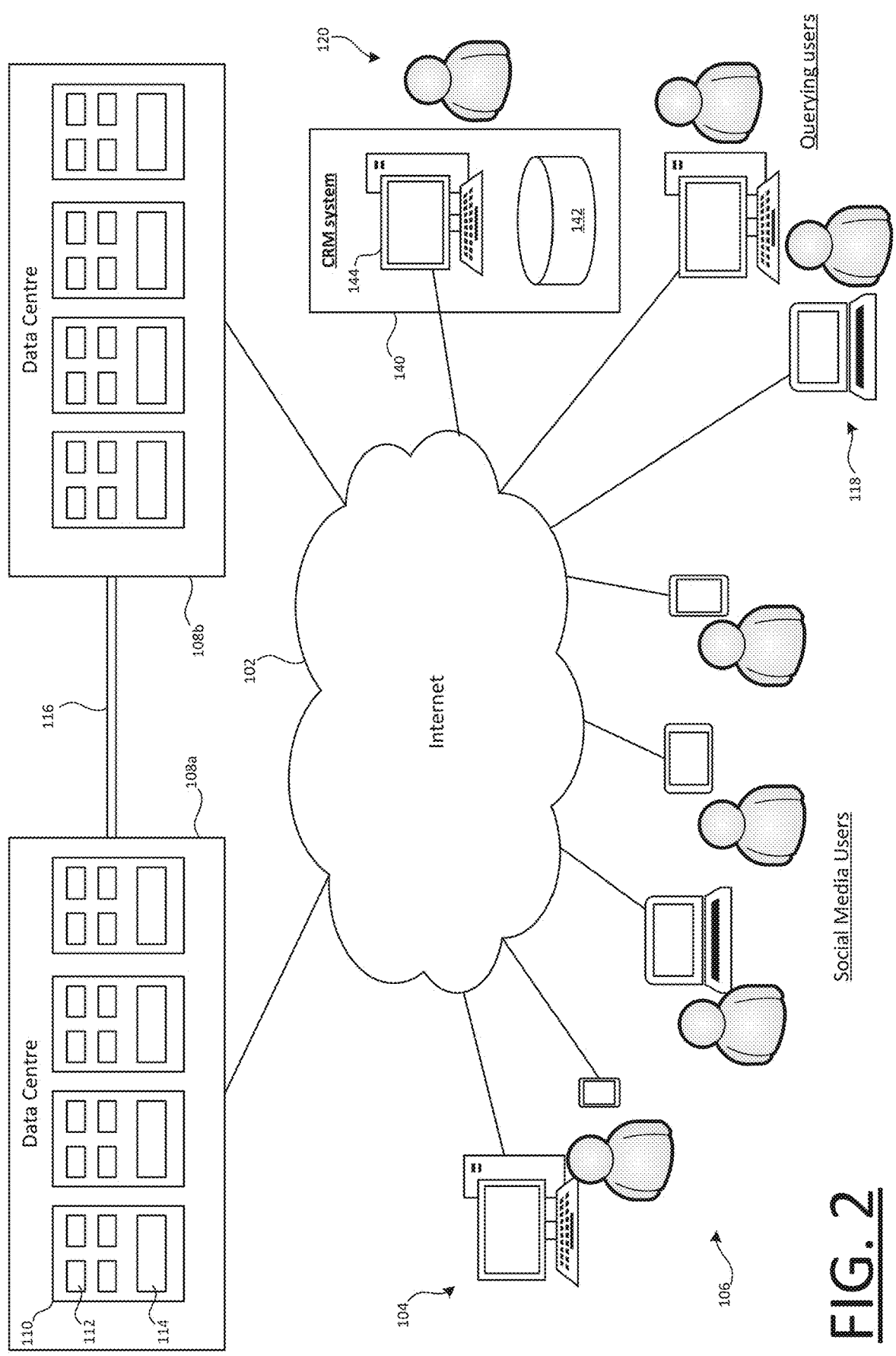
FIG. 2 shows a schematic block diagram of a computer system in which a content processing system can be implemented.

FIG. 2 shows a schematic block diagram of a computer system in which various devices are connected to a computer network 102 such as the Internet. These include user devices 104 connected to the network 102 and which are operated by users 106 of a social media platform.

The term "social media platform" refers herein to a content publication platform, such as a social network, that allows the social media users 106 to interact socially via the social media platform, by publishing content for consumption by other social media users 106, and consume content that other social media users 106 have published. A social media platform can have a very large number of users 106 who are socially interacting in this manner—tens of thousands or more with the largest social media platform today currently having user bases approaching 2 billion users. The published content can have a variety of formats, with text, image and video data being some of the most common forms. A piece of published content can be "public" in the sense that it is accessible to any user 106 of the social media platform (in some cases an account within the social media platform may be needed, and in others it may be accessible to any Web user), or it can be "private" where it is rendered accessible to only a limited subset of the social media users 106, such as the sharing user's friends. That is, private content is rendered accessible to only a limited audience selected by the user publishing it. Friendships and other relationships between the users 106 of the social media platform can be embodied in a social graph of the social media platform, which is a computer-implemented data structure representing those relationships in a computer readable format. Typically, a social media platform can be accessed from a variety of different user devices 104, such as smart phones, tablets and other smart devices, or other general purpose computing devices such as laptop or desktop computers. This can be via a web browser or alternatively a dedicated application (app) for the social media platform in question. Examples of social media platforms included LinkedIn, Facebook, Twitter, Tumblr etc.

Social media users 106 can publish content on the social media platform by generating new content on the platform such as status updates, posts etc., or by publishing links to external content, such as articles etc. They can consume pieces of content published by other social media users 106 for example by liking, re-sharing, commenting on, clicking on or otherwise engaging with that content, or simply having that content displayed to them without actively engaging with it, for example in a news feed etc. (that is, displaying a piece of content to a social media user is considered a consuming act in itself in some contexts, for which an interaction event is created, as it is assumed the user has seen the displayed content). That is, the term "consumption" can cover both active consumption, where it is evident the user has made a deliberate choice to consume a specific piece of content, and passive consumption, where all that is known is that a specific piece of content has been rendered available to a user and it is assumed he has consumed it.

To implement the social media system, a back-end infrastructure in the form of at least one data centre is provided. By way of example FIG. 2 shows first and second data centres 108a, 108b connected to the network 102, however as will be appreciated this is just an example. Large social media systems in particular may be implemented by a large number of data centres geographically distributed throughout the world. Each of the data centres 108a, 108b is shown to comprise a plurality of servers 110. Each of the servers 110 is a physical computing device comprising at least one processing unit 112 (e.g. CPU), and electronic storage 114 (memory) accessible thereto. An individual server 110 can comprise multiple processing units 112; for example around fifty. An individual data centre can contain tens, hundreds or even thousands of such servers 110 in order to provide the very significant processing and memory resources required to handle the large number of social interactions between the social media users 106 via the social media platform. In order to publish new content and consume existing content, the user devices 104 communicate with the data centres 108a, 108b via the network 102. Within each of the data centres 108a, 108b, data can be communicated between different servers 110 via an internal network infrastructure of that datacentre (not shown). Communication between different data centres 108a, 108b, where necessary, can take place via the network 102 or via a dedicated backbone 116 connecting the data centres directly. Those skilled in the art will be familiar with the technology of social media and its possible implementations so further details of this will not be described herein.

The frequent and varied social interactions between a potentially very large number of social media users 106 contains a vast array of information that is valuable in many different contexts. However processing that content to extract information that is meaningful and relevant to a particular query presents various challenges.

The described embodiments of the present invention provide a content processing system which processes events of the kind described above in order to respond to queries from querying users 120 with targeted information relevant to those queries, in the manner outlined above. The querying users 120 operate computer devices 118 at which they can generate such queries and submit them to the content processing system.

A data processing system 200 comprising the content processing system 202 will now be described with reference to FIG. 3, which a schematic block diagram for the system 300.

The content processing system 202 is shown to comprise a content manager 204, and attribute manager 206, a content processing component 208 and a query handler 210. The content manager 204, attribute manager 206, content processing component 208 and query handler 210 of the content processing system 202 are functional components, representing different high level functions implemented within the content processing system 202.

At the hardware level, the content processing system 202 can be implemented in the data centres 108a, 108b of the social media system back end itself (or in at least one of those data centres). That is, by content processing code modules stored in the electronic storage 114 and executed on the processing units 112. Computer readable instructions of the content processing code modules are fetched from the electronic storage 114 by the processing units 112 for execution on the processing units 112 so as to carry out the functionality of the content processing system 202 described herein. Implementing the content processing system 202 in the social media data centres 108a, 108b themselves is generally more efficient, and also provides a greater level of privacy and security for the social media users 106, as will become apparent in view of the following. However, it is also viable to implement it in a separate data centre (particularly when only public content is being processed) that receives a firehose(s) from the social media platform via the Internet 102.

As explained below, the content manager 204 and attribute manager 206 form part of a privatization stage 210a of the content processing system 202. They co-operate so as to provide an internal layer of privacy for social media users by removing all user-identity from the events and user attributes before they are passed to the content processing component 208. The content processing component 208 and query handler 210 constitute a data processing stage, which is a content processing stage 210b of the content processing system 202, at which events and attributes are processed without ever having access to the users' underlying identities in the social media platform. This privatization is particularly important for private content.

The steps taken to remove the user-identity can be seen as a form of anonymization. However, for the avoidance of doubt, it is noted that removing the user-identity does not fully anonymize the events 212 or user data, as it may still be possible to identify individual users through careful analysis based on their attributes and behaviour. For this reason, the anonymized events and user data are never released by the content processing system 202, and the additional anonymization steps outlined above are taken on top of the removal of the user identity to ensure that individual users can never be identified from the aggregate information released by the system 202.

To implement the privatization, the content manager 204 receives events 212 of the social media platform where, as noted, each of the events 212 represents a social interaction that has occurred on the social media platform and comprises a user identifier 214 of one of the social media users 106 who performed that interaction. That is, the user who published or consumed the piece of content to which the event relates. The user identifiers 214 in the events 212 constitute public identities of the social media users 106. For example, these can be user names, handles or other identifiers that are visible or otherwise accessible to other social media users 106 who can access the published content in question. As part of the privatization stage 210a, the content manager modifies the events 212 to replace the public identifiers 214 with corresponding anonymized user identifiers 224 in the modified events 222, which can for example be randomly generated tokens. Within the content processing stage 210b, the anonymized tokens 224 act as substitutes for the public identifiers 214. The content manager 204 replaces the public identifiers 214 with the anonymous tokens 224 in a consistent fashion, such that there is a one-to-one relationship between the public identifiers 214 and the corresponding tokens 224. However, the public identifiers 214 themselves are not rendered accessible to the content processing stage 210b at any point.

Beyond the fact that these anonymized identifiers 224 allow each user's events to be linked together, these anonymized tokens 224 do not convey any information about the identity of the social media users 106 themselves.

As such, an important function of the attribute manager 206 is one of generating what are referred to herein as "anonymized user descriptions" 240. Each anonymized user description 240 comprises a set of attributes for one of the social media users 106 and is associated with the anonymized user identifier 224 for that user. In the example of FIG. 3B, each of the anonymized user descriptions 240 comprises a copy of the anonymized user identifier 224 and is provided to the content processing component 208 separately from the modified events 222. This in turn allows the content processing component 208 to link individual events 222 with the attributes for the user in question by matching the anonymized tokens in the anonymized user descriptions 240 to those in the events 224, and augmenting those events with those attributes. The user descriptions 240 can be updated as the user attributes change, or as new user information becomes available, for incorporation in subsequent events. Alternatively, the user attributes could instead be provided to the content processing component 208 as part of the events 222 themselves.

The attribute manager 206 can determine the user attributes 226 for the anonymized user descriptions 240 from user data 242 of the social media system itself. For example, the user data that forms part of the social media user's accounts within the social media system. The social media user data 242 can for example comprise basic demographic information such as gender, age etc. From this, the attribute manager 206 can determine basic user attributes such as gender attributes, age (or age range) attributes etc.

User attributes determined from the user data 242 of the social media system itself are referred to herein as a first type of user attribute or, equivalently, "native" attributes (being native to the social media platform itself). The attribute manager 206 may also be able to determine user attributes of other types in certain circumstances, from other sources of data.

The query handler 210 handles incoming queries submitted to the content processing system 202 by the querying users 120. These queries are essentially requests for aggregate information relating to the publication and/or consumption of content within the social media system. As noted, this may involve applying a querying filter(s) where, in general, a querying filter can be defined in terms of any desired combination of user attributes 226 and/or tags. The content processing component 208 filters the events 222 to filter out any events that do not match the querying filter.

The basic elements of a query essentially fall into one of two categories: elements that specify user demographics (in terms of user attributes); and elements that specify particular content (in terms of tags). For the former, the aim is to filter out events 222 for users outside of the desired demographic (filtering by user attribute). For the latter, the aim is to filter out events that are not relevant to the specific tags, (filtering by metadata).

For example, for a query defined in terms of one or more user attributes and one or more tags (see above), the content processing component 208 filters out any events 222 for users without those attributes and any events 222 that do not match those tags, leaving only the events for users having those attributes and which also match those tags. From the filtered events (i.e. the remaining events) the content processing component 208 can extract the desired aggregate and anonymized information.

As will be appreciated, this is a relatively simple example presented for the purposes of illustration and it is of course possible to build more a complex queries and to return results with more detailed information. For example, a general query for any popular topics for a specified demographic of users (as defined by set of attributes) may return as a result one or more popular topics together with a number of unique users in that demographic and who been engaging with that topic. As another example general query requesting information about which demographics a specified topic is popular with may return a set of user attributes and a number of unique users having those attributes and who have engaged with that topic recently. Here, the concept mentioned above of over-indexing becomes pertinent: for example, the response to the query may identify demographics (in terms of attributes) for which the topic is over-indexing, i.e. indicating that this topic is not merely popular within that demographic but more popular than the average across all demographics (or at least a wider demographic).

As noted, certain types of tag, such as topic, can be generated by processing the pieces of published content 216 themselves, for example using natural language processing in the case of text and image recognition in the case of static images or video. This enrichment can be performed before or after the user-identities have been stripped out (or both).

Queries submitted to the content processing system 202 are handled and responded to in real time, where real time in this particular context means that there is only a short delay of two seconds or less between the query being received at the content processing system 202 and the content processing system 202 returning a result. The filtering needed to respond to the query is performed by the content processing component 208 in response to the submission of the query itself. That is, the content processing component 208 performs the filtering in real-time when the query is received. Any pre-processing or enrichment of the events need not be performed in real time, and can for example be performed as the events are received at the relevant part of the system.

Once the events 222 have been filtered as needed to respond to the query in question, the content process component 208 extracts, from the filtered events in real-time, anonymized, aggregate information about social interactions on the social media platform. That is, aggregate information about the publication and/or consumption of content by the social media users 106.

As will be apparent, new events 212 will be constantly generated as the content processing system 202 is in use. For example, for popular social media platforms, hundreds of thousands of new events may be generated every minute as users frequently publish new content or consume existing content. To handle the large volume of data, the resulting anonymized events 222 are only retained at the anonymized content processing stage 210b for a limited interval of time, for example 30 days or so. In that case, the result returned in response to a query relates to activity within the social media platform within that time interval only.

Alternatively, rather than a blanket retention rule of this nature, the amount of time for which events 222 are retained may be dependent on the events themselves. For example events relating to more popular content may be retained for longer. This allows older information for more popular content to be released upon request.

Figure 3:
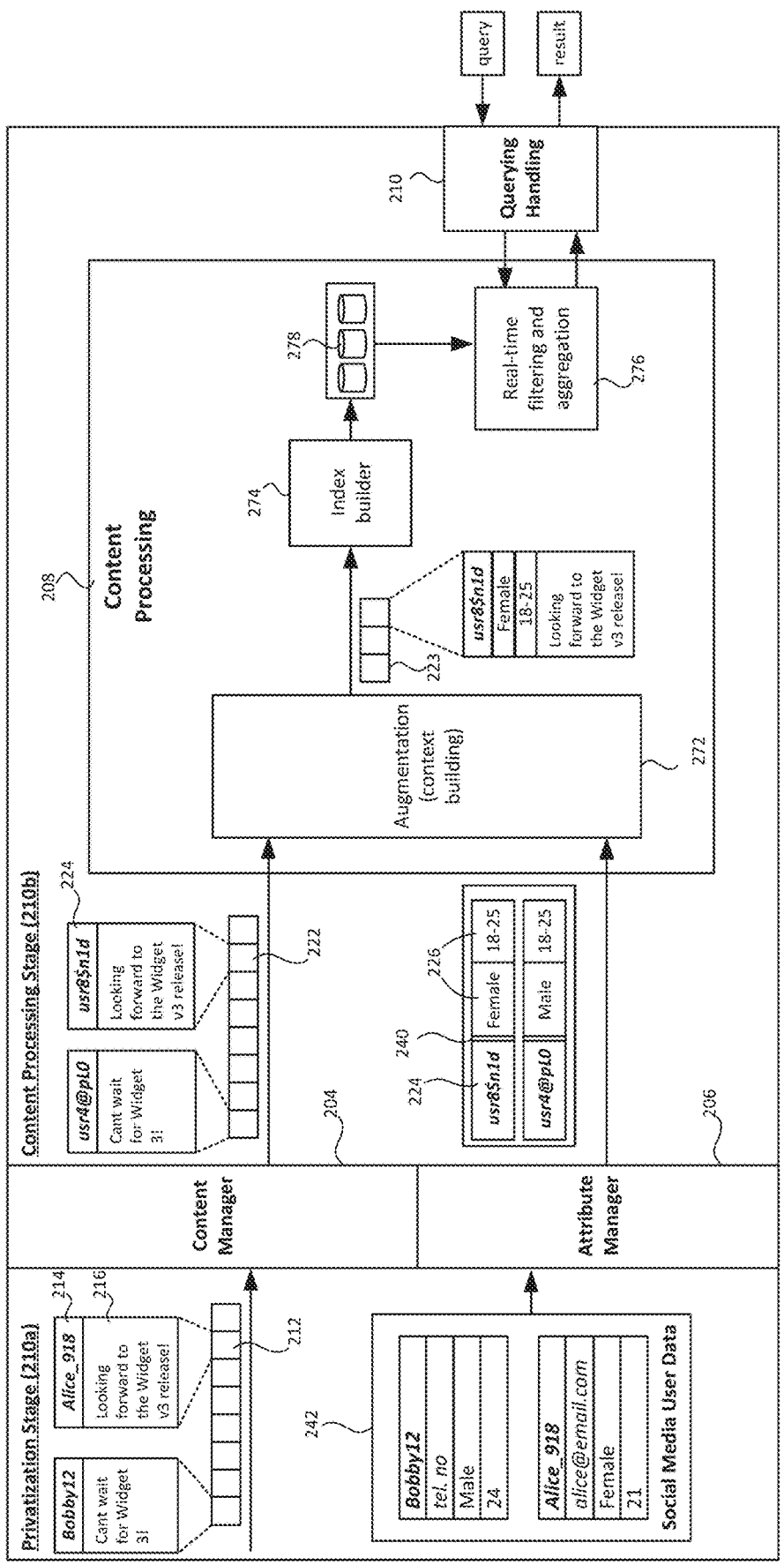
FIG. 3 shows a block diagram of a content processing system in accordance with the present invention.

FIG. 3 also shows details of the content processing component 210 in one embodiment of the present invention. The content processing component is shown to comprise an augmentation component 272, which receives the events 222 and the user descriptions 224. These can for example be received in separate firehoses. The augmentation component augments the events 224 with the user attributes 226. That is, for every one of the events 222, the augmentation component adds, to that event 222, a copy of the user attributes associated with the user identifier in that event 222. The augmented events 223 are passed to an index builder 274, which corresponds to the index builder 600 in FIG. 1A and operates as described above to create indexes 278 populated with selected and enriched ones of the augmented events 223. The indexes 278 are rendered accessible to a real-time filtering and aggregation component 276 of the content processing component 210, which operates as described above with reference to FIG. 1B in order to filter and aggregate events in the index in real-time as and when it is instructed to do so by the query handler 210. The indexes 278 and filtering and aggregation component 276 are also shown in FIG. 3A. Events 223 are purged from the indexes 278 in accordance with the retention policy.

As indicated above, whilst the privatization stage 210a is particularly important for private content, it is not essential, and can in particular be omitted for public content in some contexts. In that case, the above techniques can be applied to the original events 212 items directly, using the public identifiers 214 in place of the anonymized identifiers 224.

An architecture for the content processing system 202 that is preferred in some contexts is described below, but first some of the considerations that led to this architecture are explained.

There are various contexts in which it is desirable to estimate a number of unique users across a set of data selected for a specific query. This can be a count for a subset of users who meet certain criteria, such as users in a particular demographic. For example, for a query requesting a breakdown into multiple buckets, a count for each bucket as described above.

In most indexing systems that are currently used to process large amounts of time-dependent data, events are organised by time. For example, events may be "sharded" (horizontally partitioned) on multiple nodes, such as database servers, according to time. This is a natural way of sharding time dependent events, such as the events in the incoming firehoses from a data provider.

With time-centred sharding, a memory-efficient way of obtaining an approximate unique user count across many nodes is to use a probabilistic data structure (counting object), such as HyperLogLog, HyperLogLog++, LogLog-Beta or another technique in the so-called "LogLog" family of count estimation techniques.

At its core, the LogLog family exploits the following observation: when a set of values is hashed—that is, a hash function is applied to each value to generate a fixed length bit sequence (hash value) where the probability of each bit being a 1 or 0 is more or less 50/50 and independent of the other bits—then, each hash function has a "run length", which can be defined as the number of leading zeros (although other definitions may be viable), where different run lengths occur with different probabilities. For a large enough data set, the resulting hash values will look like:

| Form of hash value | Run length: | Expected percentage of this form | Probability of occurrence |
|---|---|---|---|
| 1xxxxxxxx | 0 | ~50% | probability of the first bit being a 1 is ~1/2 |
| 01xxxxxxxx ... | 1 | ~25% | probability $(1/2)^2$ |

| Form of hash value | Run length: | Expected percentage of this form | Probability of occurrence |
|---|---|---|---|
| 001xxxxxxx ... | 2 | ~12.5% | probability $(1/2)^3$ |
| 0001xxxxxx ... | 3 | ~6.25% | probability $(1/2)^4$ |
| 00001xxxxx ... | 4 | ~3.125% | probability $(1/2)^5$ |
| ... | | ... | ... |
| 0000000001 ... | 9 | ~0.1% | probability $(1/2)^{10}$ |

Now, looking at this the other way round and in very high-level terms, when, say, there is a single hash value of the form 0000000001xx (i.e. of run length 9) observed in a set of hash values computed in this way, chances are there ~1000 unique values in the original set [0.1% of 1000=1 such hash value expected]. Applied to events, each event can be hashed, and, in essence, all the system needs to keep track of is the longest run of 0's observed so far in the hashed values to estimate the number of unique events observed, without having to count those events individually.

Whilst this observation could be used to estimate a count of unique elements in a data set (cardinality), the problem is that a small number of outlying results can skew the result significantly, leading to a very wide margin of error for the final count.

To avoid this, the LogLog family builds on this basic premise by splitting the hashed values into M "hash buckets", and observing the maximum run length for each of these M hash buckets independently. This results in M maximum run length values, which are then averaged to obtain this final count. There are various ways this averaging can be performed, and different LogLog algorithms perform the averaging in quite different ways (this is the main point of difference between the various LogLog algorithms). The error of the final count scales as $$\frac{1}{\sqrt{M}}$$

and thus the accuracy of the estimated count increases with M, at the cost of requiring more memory to perform the estimation as the system has to maintain keep track of a run length value for each hash bucket.

These M values are stored in a probabilistic data structure (counting object) having M hash buckets to contain these M run length values derived from the hashed values, as described in further detail below. For conciseness, this counting object is referred to as an "HLL object" below (or simply "an HLL"), although it will be appreciated that the data structure is not actually specific to HyperLogLog, and other techniques in the LogLog family, such HyperLogLog+ or LogLog-Beta variants use the same type of counting object. Moreover, for the avoidance of doubt, it is noted that all description pertaining to HyperLogLog herein applied equally to any other technique in the LogLog family such as HyperLogLog++, LogLog-Beta and any variants thereof.

In addition to being space-efficient, the HLL object has a convenient property that an HLL object computed on one node can be merged with an HLL object computed on another node, and the resulting HLL object still gives a good approximation of the number of distinct authors across the two (or more) nodes; that is, the error rate remains low and isn't compounded by merging multiple HLL objects together. A set of HLLs are merged to form a merged HLL by taking the maximum value of each hash bucket across the set of HLLs being merged. That is, the value of each hash bucket of the merged HLL object is the maximum value of that hash bucket across the set of HLLs being merged.

Figure 4A:
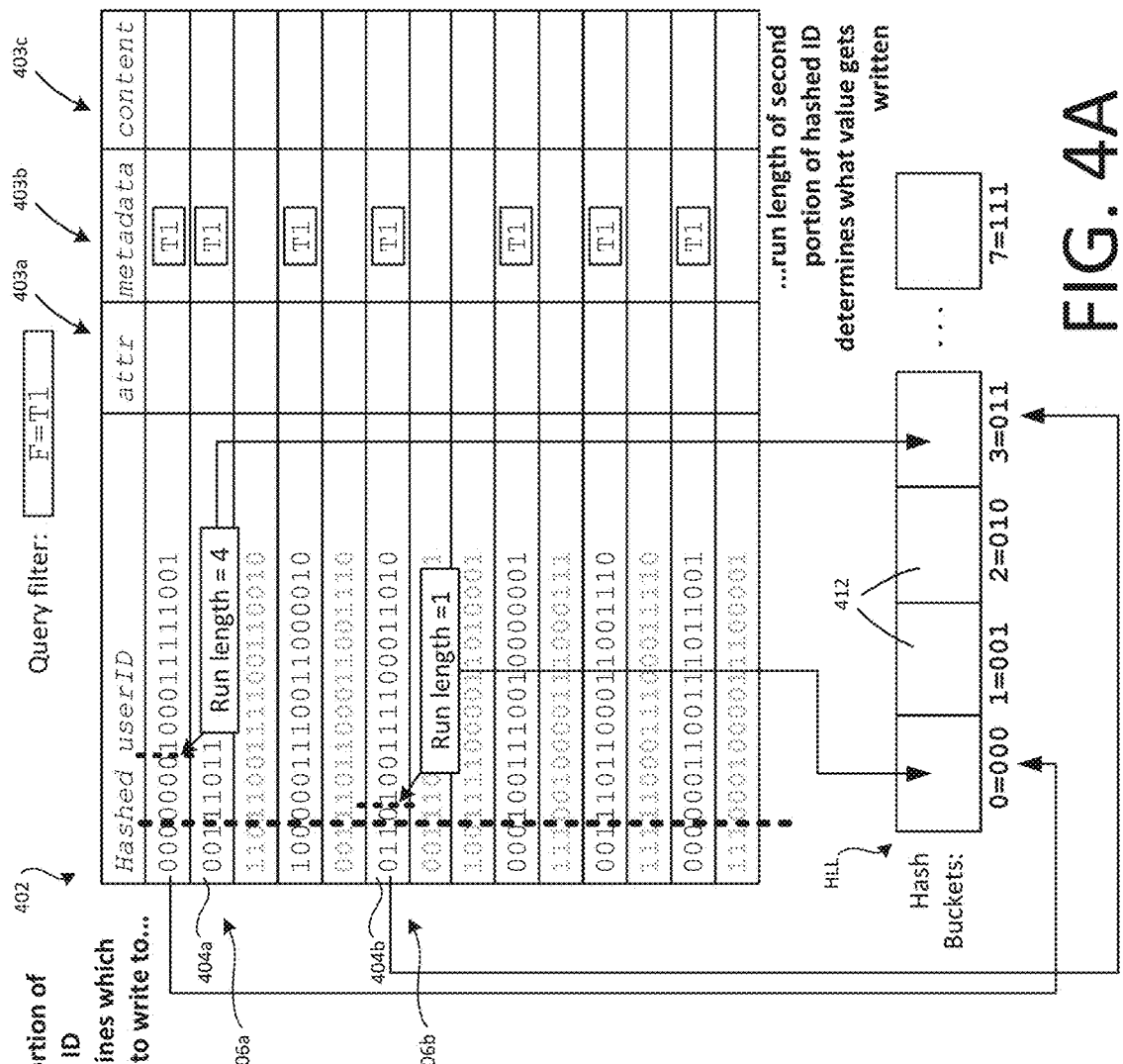
FIG. 4A illustrates certain principles of the LogLog family of count estimation techniques.
Figure 4B:
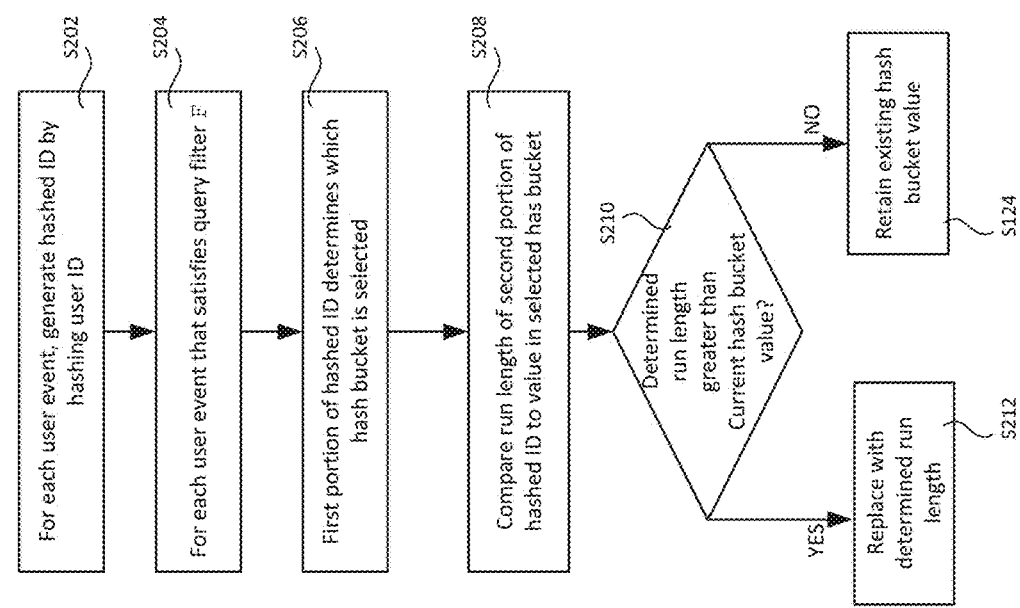
FIG. 4B shows a flowchart for a method of estimating a unique user count.

With reference to FIGS. 4A and 4B, some of the principles underlying the LogLog family of cardinality estimation techniques will now be described in the context of estimating a unique user count from a set of interaction events 402. FIG. 4A shows the set of interaction events 402 and an HLL object (labelled HLL) generated from the set of interaction events 402, and FIG. 4B shows a flowchart for a method of generating the HLL object from the interaction events 402.

In addition to its user ID, each of the user events comprises respective user attributes 403a for that user, respective metadata 403b, and content 403c from which the metadata 403b is derived (though this may be omitted if the metadata is sufficient on its own).

In order to build the HLL object, the user ID of each of the interaction events 402 is hashed (S202), by applying a hash function to it, to generate an identifier hash (hashed ID) for each of the interaction events 402, such as first and second hashed IDs labelled 406a and 406b in FIG. 4A generated for first and second interaction events 404a, 404b respectively.

The hash function has a bit-length L, whereby each of the hashed IDs is string of L bits derived from the user ID to which the hash function is applied. The hash function has an output range of $2^L$, i.e. there are $2^L$ possible values for the resulting hashed IDs, and the hash function is such that the hashed IDs are more or less evenly distributed over its output range. As noted, for each hashed ID, the probability of any of its L bits being a zero is approximately 50% and is substantially independent any other of its L bits.

The HLL object has M container elements 412 (entries), where M=8 in this example, one for each of the hash buckets, in which a run length value for that hash bucket can be held. At the physical level, a memory region is reserved for each hash bucket in which the bucket value is stored. The hash buckets have bucket indexes 0=000 (in binary, represented by a three-bit value), 1=001, 2=010, . . . , 7=111 respectively, which are used to index the corresponding container elements 412.

At Step S204, an indication of a filter F is received and, in order to obtain an estimated unique user count for that filter F, each of the interaction events 402 satisfying the filter F is identified (S204). This can be a filter indicated in a query, and as noted multiple filters may need to be applied for a single query, e.g. in order to provide breakdowns of a count (see FIG. 1B). In the simple example of FIG. 4A, the filter F is satisfied by any user events whose metadata contains a specific tag T1, which may for example correspond to a certain topic; here, the unique user count for the filter F is thus the total number of unique users who have engaged with that topic in some way, for example by posting about that topic, liking that topic, sharing that topic etc. However, more complex filters may be applied, as noted above. In FIG. 4A, interaction events that do and do not satisfy the filter F=T1 are indicated by the presence and absence of the tag T1 in their respective metadata 403b; user events that do not satisfy the filter F are also shown greyed-out. Among others, the first and second interaction events 404a, 4040b satisfy the filter F in this example.

For each interaction event that does satisfy the filter F, a first portion of its hashed ID ("bucket index portion") determines which hash bucket that user event belongs to, and is used to select a corresponding one of the M hash buckets of the HLL object (S206) in the following manner.

In this example, the bucket index portion is the three leading bits of the hashed ID, and the hash bucket with the corresponding hash bucket index is selected. So, for the first interaction event 404a, whose hashed ID 406b has "000" as its three leading bits, the hash bucket with bucket index 0=000 is selected; for the second interaction event 404b, whose hashed ID has "011" as its three leading bits, the hash bucket with bucket index 3=011 is selected.

More generally, with $M=2^X$ hash buckets, it is sufficient to use X bits of the hashed IDs as the bucket index portion (more could be used, though this would introduce some potentially unnecessary redundancy), and it can be convenient to use the leading bits (but this is not essential—the first portion can be any subset of the bits).

A second portion of the hashed ID—the remaining bits in this example—are then used to determine what value, if any, gets written to the selected hash bucket, at step S208. A run length of the second portion is determined, as the number of leading zero bits in this example, and if this is greater than the current run length value held in the container element 412 for the selected hash bucket (S210), that value is changed to match the determined run length (S212); otherwise that value is left unchanged (S214). As can be seen, once all of the interaction events 402 have been processed in this manner, each of container elements 412 contains the maximum observed run length for the hash bucket to which it corresponds.

As indicated, a total unique user count can be obtained from the HLL at this point using a variety of averaging methods.

Alternatively, the final HLL object can be combined with an HLL object(s) computed elsewhere in parallel from another set of interaction events to obtain a count for the events as a whole, in a parallel computing context. However, this presents certain practical challenges that will now be explained.

The amount of memory that needs to be reserved for a single HLL object is relatively small. For example, it is possible to obtain a count for large data sets with an error rate of around 2% with ~1.5 kB HLL object. A 1.5 KB HLL with a ~2% error rate should be able to count tens of millions of distinct objects.

However, in the present context, even in a single query, the need can arise to retrieve information that is broken down into potentially hundreds or even thousands of buckets. As an example, it may be desirable to filter events in the index 278 on people in a certain age range and country, and return the counts of people broken down into buckets by their industry by applying additional filtering on top of this, for example by their job function, by the top articles shared by each industry job function etc.

Regarding terminology, buckets in this sense are referred to below as "user buckets", to distinguish from the HLL hash buckets. Each user bucket can be seen as "containing" a subset of the user events that meet one or more criteria associated with that user bucket, for example for users that fall into certain demographics (e.g. male; male age 18-20; females with a certain job function etc. each correspond to a different user bucket).

Figure 7:
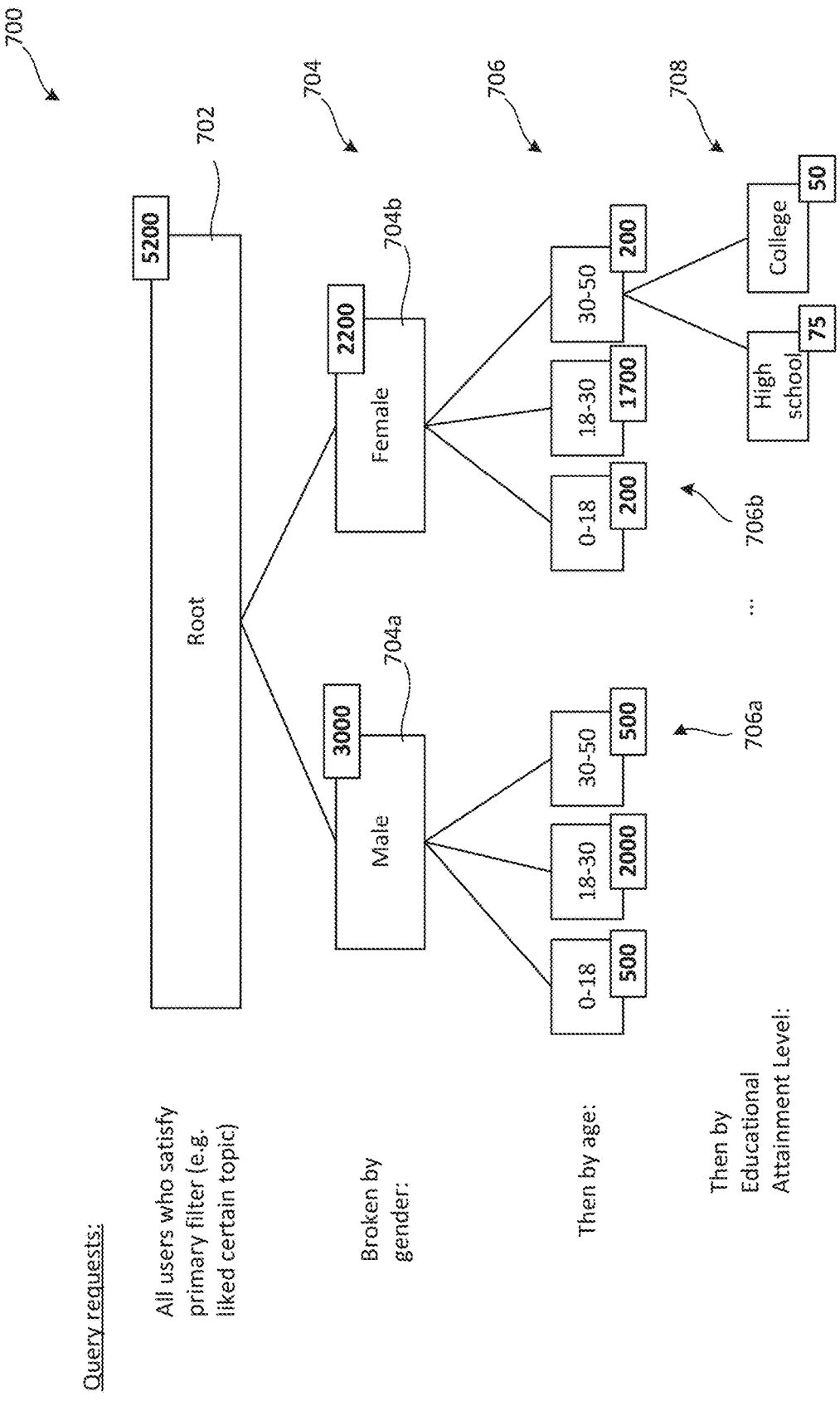
FIG. 7 illustrates an example of hierarchical user buckets for which counts can be estimated.

By way of example, FIG. 7 shows how multiple breakdown levels—three levels in this example—can be embodied as a tree 700, which is a hierarchical data structure. The tree 700 has a plurality of nodes, each corresponding to a different user bucket. One of the nodes is a root node 702, at the top of the tree 700, which represents the highest-level user bucket for all users who satisfy a primary filter. For example, all users who liked or shared a certain topic. First level nodes 704, i.e. direct children of the root node 702, correspond to the first level of breakdown. In this example, the first level of breakdown is according to gender, and there are two first level nodes 704a, 704b, corresponding to the subset of users in the highest-level user bucket who are male and female respectively. Second level nodes 706 and third level nodes 708, i.e. direct children of the first level nodes 704 and direct children of the second level nodes 706 respectively, correspond to the second and third levels of breakdown etc. In this example, the second level of breakdown is according to age bracket (four age brackets: 0-18, 18-30, 30-50 and 50+). Each second level node 706 is a child of one of first level nodes 704, with each child of the male node 704a representing the subset of males within a certain age bracket (the children of the male node 704a are labelled 706a), and likewise each child of the female node 704b representing the subset of females in a certain age bracket (the children of the female node 704b are labelled 706b). The third level of breakdown is according to educational attainment, thus each third level node represents the subset of users of a particular gender, in a particular age bracket and with a particular educational attainment level. A count, shown is bold, is estimated for each of the nodes, which is an estimate of the number of users in the corresponding user bucket. For each node having children, the count for that node is expected to match the sum of the counts for its children (at least approximately).

With HLL, generating a response to a single query of this nature might need hundreds or thousands of HLL objects to be generated, as at least one HLL object may be needed per user bucket to which the query relates, to generate separate counts for the user buckets. In the example of FIG. 7, at the very least, an HLL count needs to be estimated for every leaf node (i.e. every node with no children). It might be possible to obtain counts for higher level nodes by summing the counts for lower level nodes but this may not always be practicable, in which case an HLL estimate may be needed for every node.

What is more, in a distributed computing content, where multiple servers are used, each of which has multiple processing threads that computer HLL objects in parallel, existing types of system would require one HLL per count per thread. At this point, the amount of memory needed at each processing node to accommodate the HLL objects in response to a single query can easily exceed 1 GB to achieve the same level of accuracy.

Moreover, a single user can run multiple queries at once, and on top of that there can be multiple users using the system simultaneously, which means the overall memory requirements to handle HLL objects on each node for all querying users (and transfer them over the network to merge them for each query) become very significant.

As explained in detail below, the present invention allows this memory overhead to be reduced very significantly, such that in a multi-thread environment, the amount of memory overhead needed on a processing node (e.g. server) with multiple threads is comparable with the size of a single conventional HLL object. Thus at a server with, say, 24 threads, the memory overhead is reduced to around $\frac{1}{24}^{th}$ of that required by conventional HLL applied in a multi-thread context.

Figure 5:
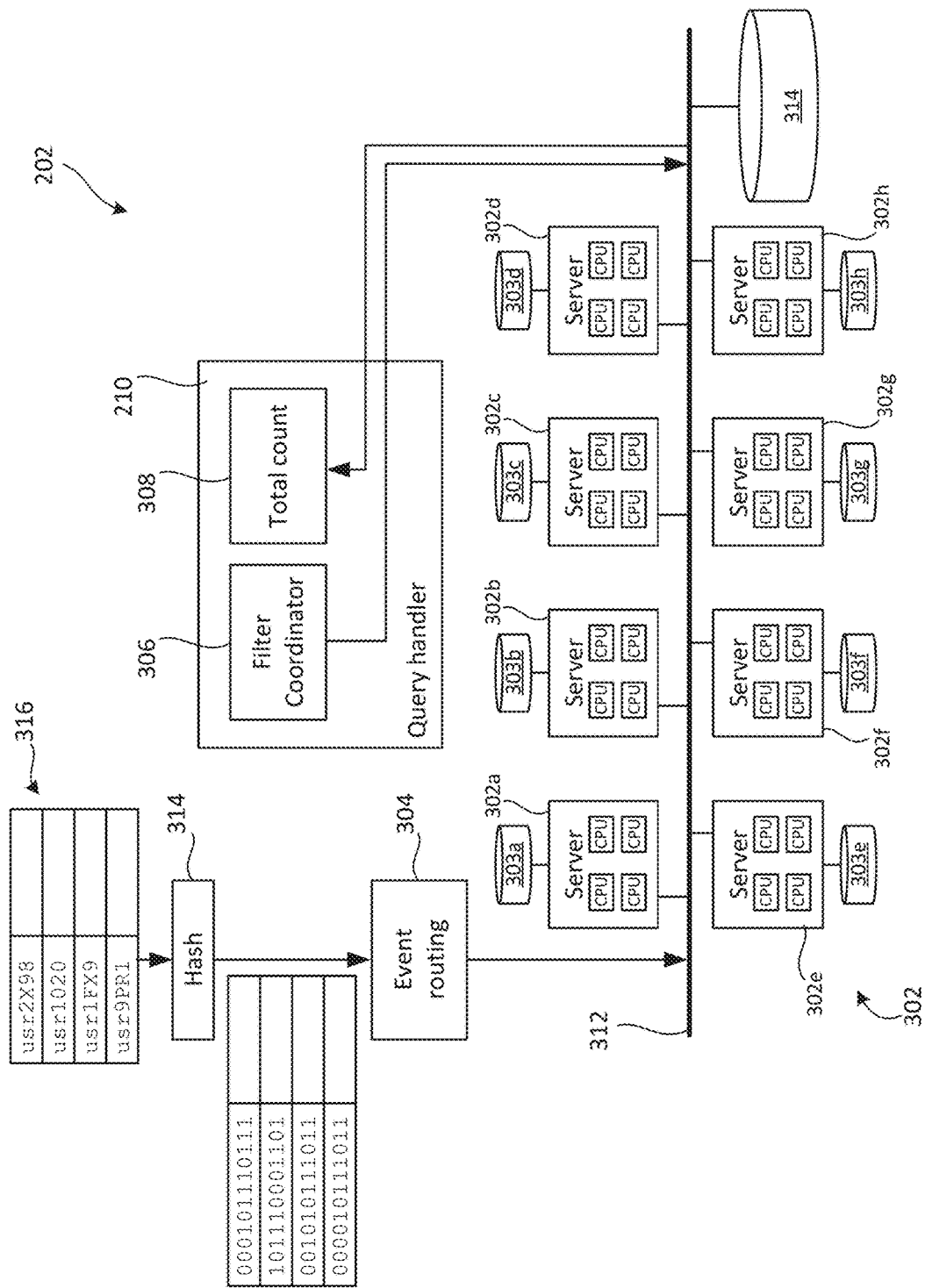
FIG. 5 shows an example of a distributed computing architecture.

FIG. 5 shows a schematic block diagram of the content processing system 202, which is shown to comprise a plurality of processing nodes 302. The nodes 302 are processing devices, each comprising at least one and preferably multiple processing units such as CPUs/CPU cores. That is, the processing nodes 302 are computer devices, such as servers. A processing unit can be for example a single-core processor or an individual core of a multi-core processor. In any event, each of the processing units is a physical unit that can execute content processing code, by fetching instructions of the content processing code from memory accessible to that processing unit and carrying out those instructions, simultaneously with the other processing units in the same content processing server to carry out parallel processing within that server. Moreover, each of the nodes 302 can perform such processing simultaneously with the other nodes 302 to perform parallel processing, across the nodes 302, of incoming events 316 received at the content processing system 202 in the firehose(s), such as the anonymized events 222 of FIG. 2.

Figure 5A:
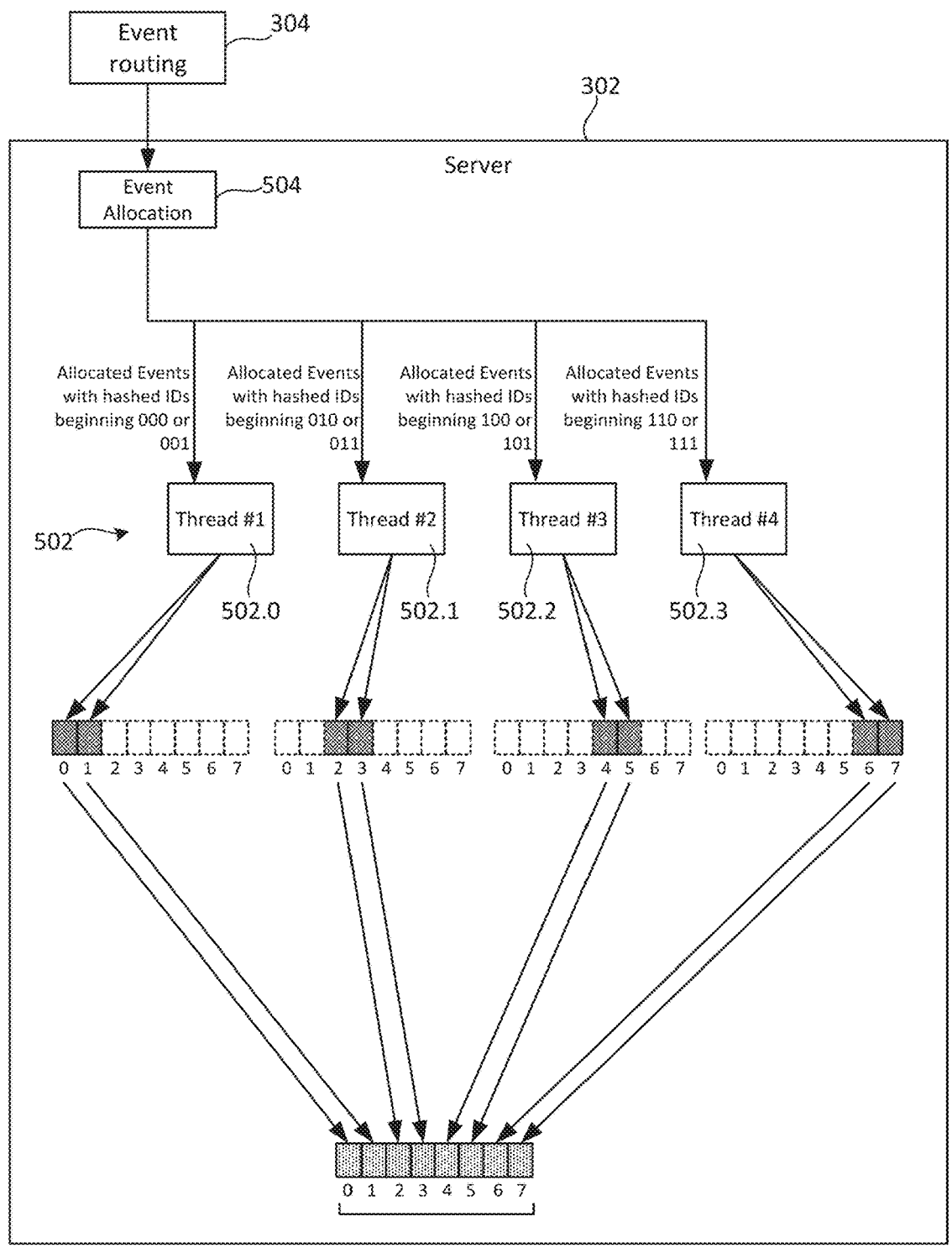
FIG. 5A illustrates certain benefits of allocating user events to processing threads based on identifier hashes and FIG. 5B illustrates a scenario without such allocation for comparison.

The processing units of each processing are configured to provide a plurality of processing threads (502, FIG. 5A). These can be hardware threads, where each hardware thread corresponds to one physical CPU or one physical CPU core, or software threads where time slicing is used to allow parallel execution on a single CPU or CPU core (each software thread essentially constitutes a "virtual" core where multiple virtual cores are provided by the same physical core), or a combination of hardware and software threads can be provided. The concept of multi-threading is well known and will not be described in further detail.

Eight individual nodes 302a-h are shown in FIG. 5, but it is expected that more processing nodes may be used in practice to handle the large amount of content published and consumed on popular social media platforms. The nodes 302 cooperate to implement the real-time filtering and aggregation component 276 of FIG. 3, in order to filter and count events efficiently.

The nodes 302 of FIG. 5 are servers located in a data centre, and can for example be a set of the servers 110 in one of the data centres 108a, 108b of the social media platform itself. The data centre has an internal network 312, provided by an internal, high-speed network infrastructure of the data centre, via which the nodes 302 can communicate with other components of the content processing system 202.

Each of the nodes 302 has access to its own local computer storage (that is, local to that node), in which it can store and modify data to carry out its content processing functions, labelled 303a-h for nodes 302a-h respectively. This can comprise volatile and/or non-volatile memory, for example solid-state or magnetic storage (or a combination of both). The term "disk" is sometimes used as short-hand for the local storage at a node, though it will be appreciated that this term does not necessarily imply traditional rotating-disk storage and also covers solid-state storage (for example).

The nodes 302 may also have access to shared computer storage 314; that is, shared between two or more of the nodes 312 and accessible via the internal network 312 of the data centre. This can be located in the data centre itself, or it may be external and accessed via an external connection connected to the internal network 312 (or a combination of both).

As well as the content processing code executed on the nodes 302 of content processing system 202, control code is also executed within the content processing system 202. The control code coordinates the content processing across the nodes 302, via the internal network 312, to ensure that it is conducted in an efficient and reliable manner. This can be executed at one of the nodes 302 or at a separate computer device of the data centre, or at multiple such devices in a distributed fashion provided it is in a manner that permits it overall visibility and control of the nodes 302.

In this respect, the content processing system 202 is shown to comprise an event router 304, a filter coordinator 306 and a total count generator 308. These are functional components of the content processing system 202, representing different high-level functions implemented by the control code when executed within the content processing system 202. The components 304-308 are shown connected to the internal network 312, to represent the fact that the signalling within the data centre needed to coordinate these functions takes place via the local network 312.

Incoming events 316 representing social interactions on the social media platform—that is, social media users publishing new content or consuming existing content—can be routed to individual nodes 302, by the event router 304 via the network 312, in any suitable manner. In some contexts, time-based allocation may be preferred, though other allocation mechanisms (such as randomized, or round-robin allocation) may be viable in other contexts.

The events 316 are routed independently of their associated identifiers, whereby user events having matching user IDs may be routed to different processing nodes for processing.

For the purposes of HLL estimation, the user ID in each of the events 316 is hashed. In this example, a hash function 314 is applied to the user IDs to generate the hashed IDs before they are routed to the processing nodes, however this could alternatively be applied at each of the processing nodes 302a-h to the user events that have been routed to those nodes. At each of the nodes 302a-302h, the events routed to that node are stored on disk once received at that node (i.e. in local storage 303a-h respectively).

Each of the nodes 302 can access the metadata and user attributes in each of the events in its ordered data structure. Either the content itself, or a tokenised version of the content (see later) is held with the metadata.

The filter coordinator 306 can instruct all of the nodes 302 to filter their allocated events according to a desired filter, where a key aim is to obtain a count of the total number of unique users across all of the nodes 302 who satisfy the desired filter. The filter can be defined in a query submitted to the system, and in this context the filter coordinator 306 and total count generator 308 can be considered part of the query handler 210. In the context of the system described above, the filter can be an interaction filter or a query filter, for example the query filter used to generated results for a given bucket. As noted, multiple (possibly thousands) of query filters may be applied to respond to a single query, with counts being generated for each.

A filter can be defined in terms of user attributes or event metadata, such as metadata tags (see above), or a combination of both.

For a filter defined in terms of a set of one or more user attributes A1, events with matching user attributes satisfy that filter. For a filter defined in terms of a set of one or more tags T1, events with matching tags satisfy that filter.

Before discussing the filtering operations, there follows a description of how content can be stored. Content items can be held in their entirety, for example if a particular field (e.g. title) might be needed verbatim as a value in a distribution query (discussed later). Alternatively, indexed tokens only may be held, with the original content discarded, as explained below.

In order to make it efficient to filter a large corpus of documents by certain keywords, a standard indexing technique (called "inverted indexing") can be used, where each document is tokenised into individual terms, and then a lookup table is created for each term in the corpus dictionary, each pointing to a list of document IDs where such term appears. For example take a simplified example of two documents:
Doc001: the brown fox jumps over the lazy dog
Doc002: the dog jumps over the sofa
Inverted Index:

| term | location (Doc#: position_in_the_doc) |
|---|---|
| the | Doc001: 1, |
|  | Doc001: 6, Doc002: 1, Doc2: 5 |
| brown | Doc001: 2 |
| fox | Doc001: 3 |
| jumps | Doc001: 4, Doc002: 3 |
| over | Doc001: 5, Doc002: 4 |
| lazy | Doc001: 7 |
| dog | Doc001: 8, Doc002: 2 |
| sofa | Doc002: 6 |

This way, if there is a requirement to know which documents mentioned the word "dog", all that is needed is a single lookup against the inverted index, instead of having to scan every single document in the corpus each time.

If returning the original document verbatim is not a requirement of the system, storing the "tokenised" inverted index only is enough for filtering and returning the correct document IDs. In this case, given the original document is discarded after indexing, it is necessary to keep a copy if a re-index operation is needed.

Thread Allocation:

Although the incoming events 316 are routed to processing nodes independently of their user IDs, once they arrive at the nodes 302a-d, they are allocated to individual processing threads of the nodes based on the hashed user IDs.

This is a key aspect of the system, as this is what allows the HLL memory overheads to be reduced so significantly at each node, for reasons that will now be explained.

Specifically, at each processing node, user events 316 are allocated to individual threads based on the bucket index portion of their hashed IDs. That is, the same portion of the hashed ID that is used to determine hash bucket allocations when it comes to computing the HLL objects. Following the example of FIG. 4A, in which eight hash buckets, identified by 3-bit hash bucket indexes, are used, events are allocated to individual threads based on the three leading bits of the hashed IDs which are also used to select between the hash buckets.

Thus, although user events are sharded "globally" across processing nodes based on time, at each processing node user events are sharded across threads based on the bucket index portions of their hashed IDs. The aim is that all user events allocated to a particular node with matching bucket indexes portions are allocated to the same processing thread, although at least some of the implementations described below have some robustness to a small number of user events being incorrectly allocated.

This is illustrated in FIG. 5A for a node 302, which can be any one of the processing nodes 302a-h described above. The node 302 is shown to have a plurality of processing threads 502—four as shown, but this is merely an example. An event allocator 504 of the node 302 allocates events to threads in the manner just described. It can for example be implemented in configurable software of the node 302, which is configured to allocate user events in the described manner. For example, it can be part of a configurable API.

Events with hashed IDs beginning 000 or 001, denoting hash buckets 0 and 1 respectively, are all allocated to a first of the threads 502.0. Events with hashed IDs beginning 010 or 011, denoting hash buckets 2 and 3 respectively, are all allocated to a second of the threads 502.1. Events with hashed IDs beginning 100 or 101, denoting hash buckets 4 and 5 respectively, are all allocated to a third of the threads 502.2. Events with hashed IDs beginning 110 or 111, denoting hash buckets 6 and 7 respectively, are all allocated to a third of the threads 502.3. A consequence of this is that, when it comes to computing HLL objects for those events, each thread will only ever need to access and modify run length values for a limited number of hash buckets—two each in this example (thread #1: buckets 0 and 1; thread #2: buckets 2 and 3; thread #3: buckets 4 and 5; and thread #4: buckets 6 and 7). That is, each thread "owns" the subset of hash buckets denoted by the hashed IDs allocated to it, and that ownership is exclusive.

Figure 5B:
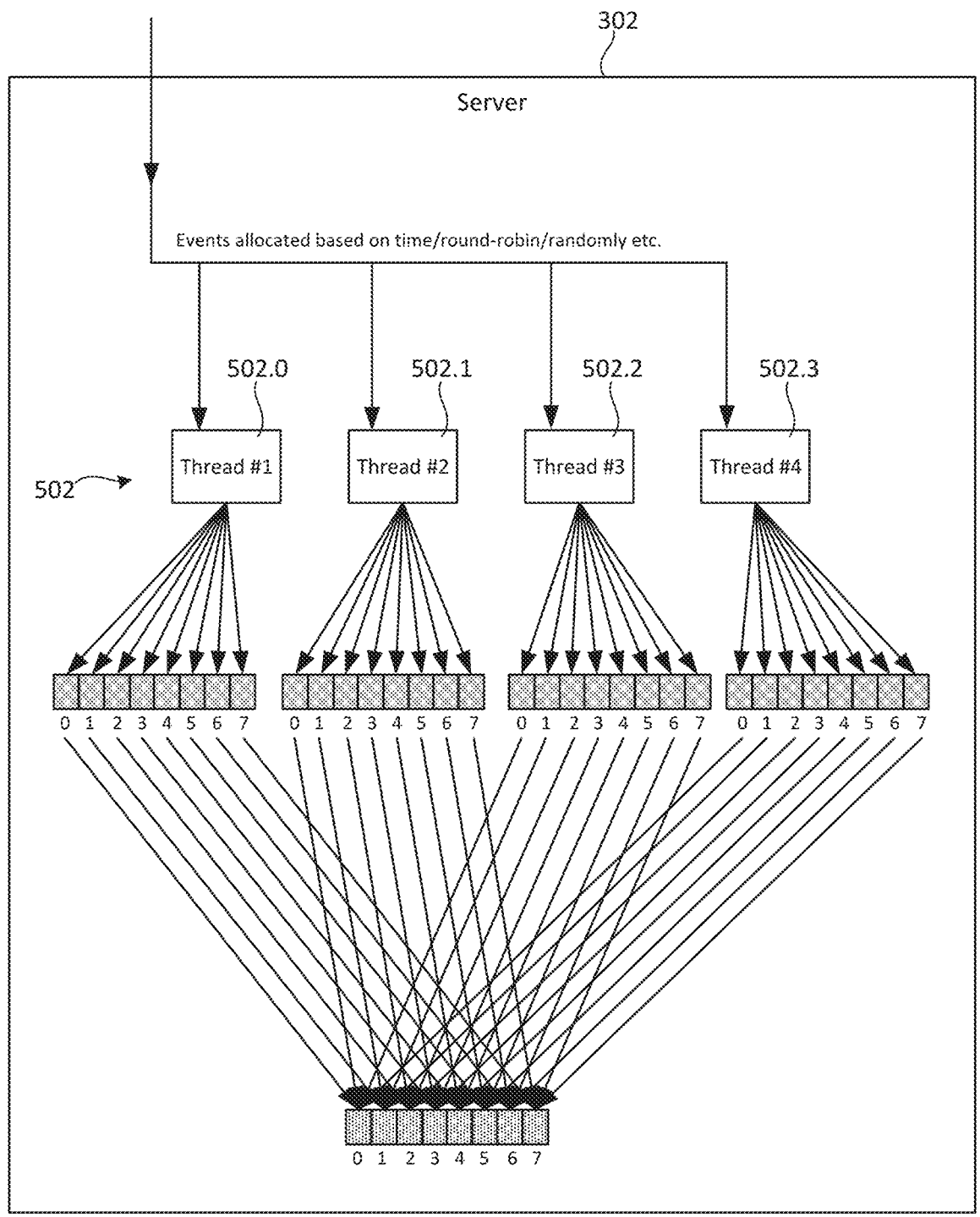

For comparison, FIG. 5B shows an example where user events are allocated to threads based on some other criteria, such as time-based allocation, round-robin or randomized, whereby each of the threads may receive user events denoting any one of the eight hash buckets. In this case, each thread will need to access and modify the run length values for all of the hash buckets during the HLL procedure. In order to prevent collisions between different threads, it is necessary for a region of memory to be reserved per hash bucket per thread, and for the results to then be merged once the computation is complete. This the memory requirements scale as:

$$N*M*l$$

where N is the number of threads, M is the number of hash buckets, and l is the bit-length of each hash bucket value (i.e. the run length as determined for that hash bucket). That is, N memory regions, each having a size sufficient to hold the determined run length, are needed per hash bucket, because each thread needs its own memory regions for thread-safe operation.

By contrast, in the case of FIG. 5A, the memory requirements scale as:

$$M*l$$

because each hash bucket is exclusively owned by one thread, and therefore only one memory region per hash bucket is needed, for use by whichever thread owns that hash bucket.

There are a number of different ways this can be implemented, and some examples will now be described.

Figure 6A:
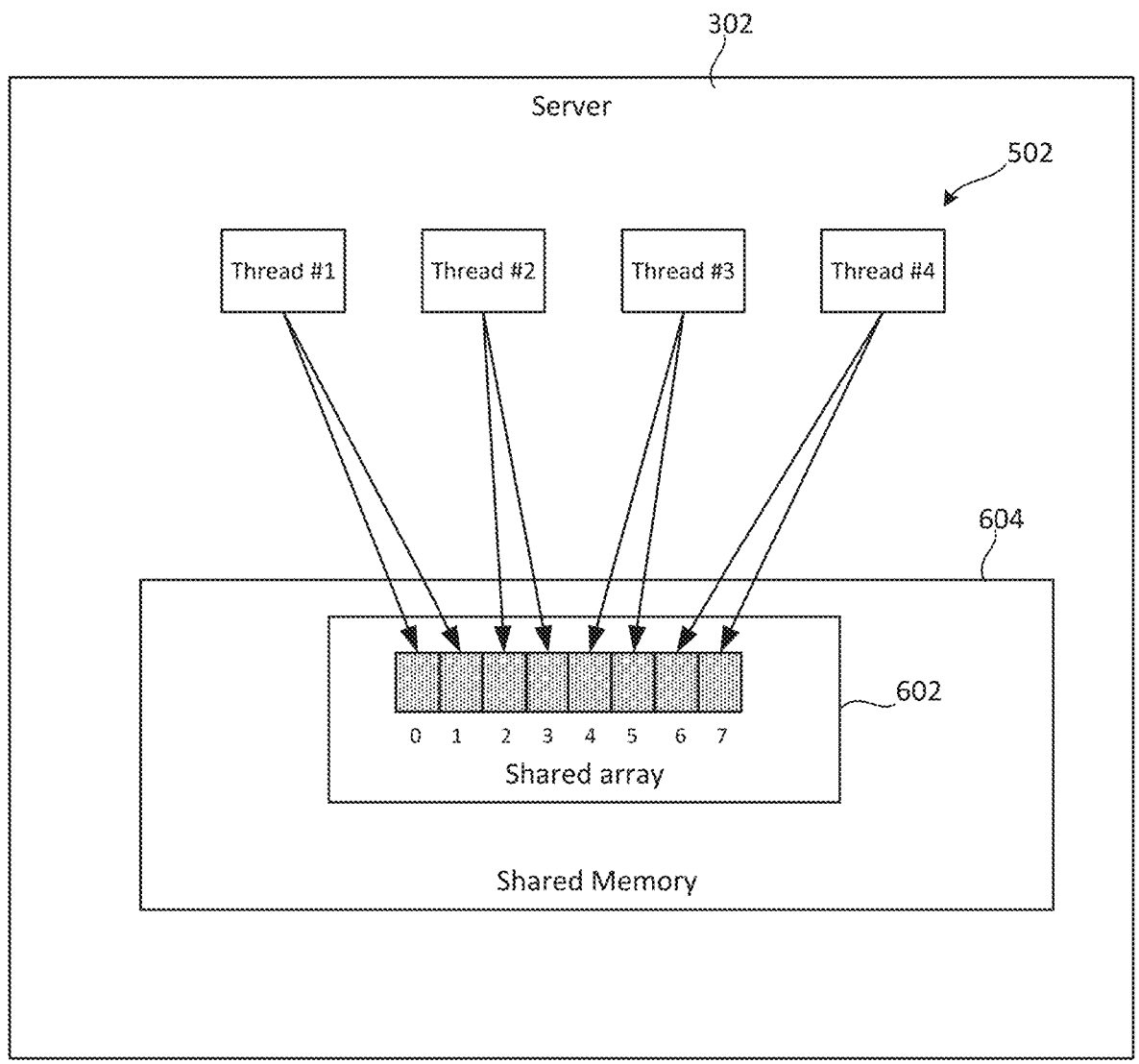
FIG. 6A illustrates a "shared" solution to multi-thread count estimation.

Shared Solution:

FIG. 6A illustrates what is referred to herein as the "shared solution", in which, at each server 302, a shared HLL object 602 is created in shared memory 604 accessible to each of the threads 502 at that server 302. The shared HLL object 602 is a shared array having an entry for each hash bucket (or an entry for each hash bucket for each user event). When events are allocated to the threads based on the bucket index portion of their hashed IDs as described above, each of the array entries will only ever be written to by one of the threads, namely the thread that owns the corresponding hash bucket. Thus even though the HLL object 602 is shared, there will be no collisions between threads trying to write to the same hash bucket as long as all of the user events are allocated correctly, without error.

The shared HLL object 602 is instantiated at each server 302 in response to a received query. At each server 302, M memory regions are reserved per user bucket, for holding M hash bucket values at that server 302 for that user bucket. That is, the hash bucket values for each count are stored within the same shared HLL array 602, and the HLL array 602 can be grown dynamically to accommodate these as needed (see below).

Figure 6B:
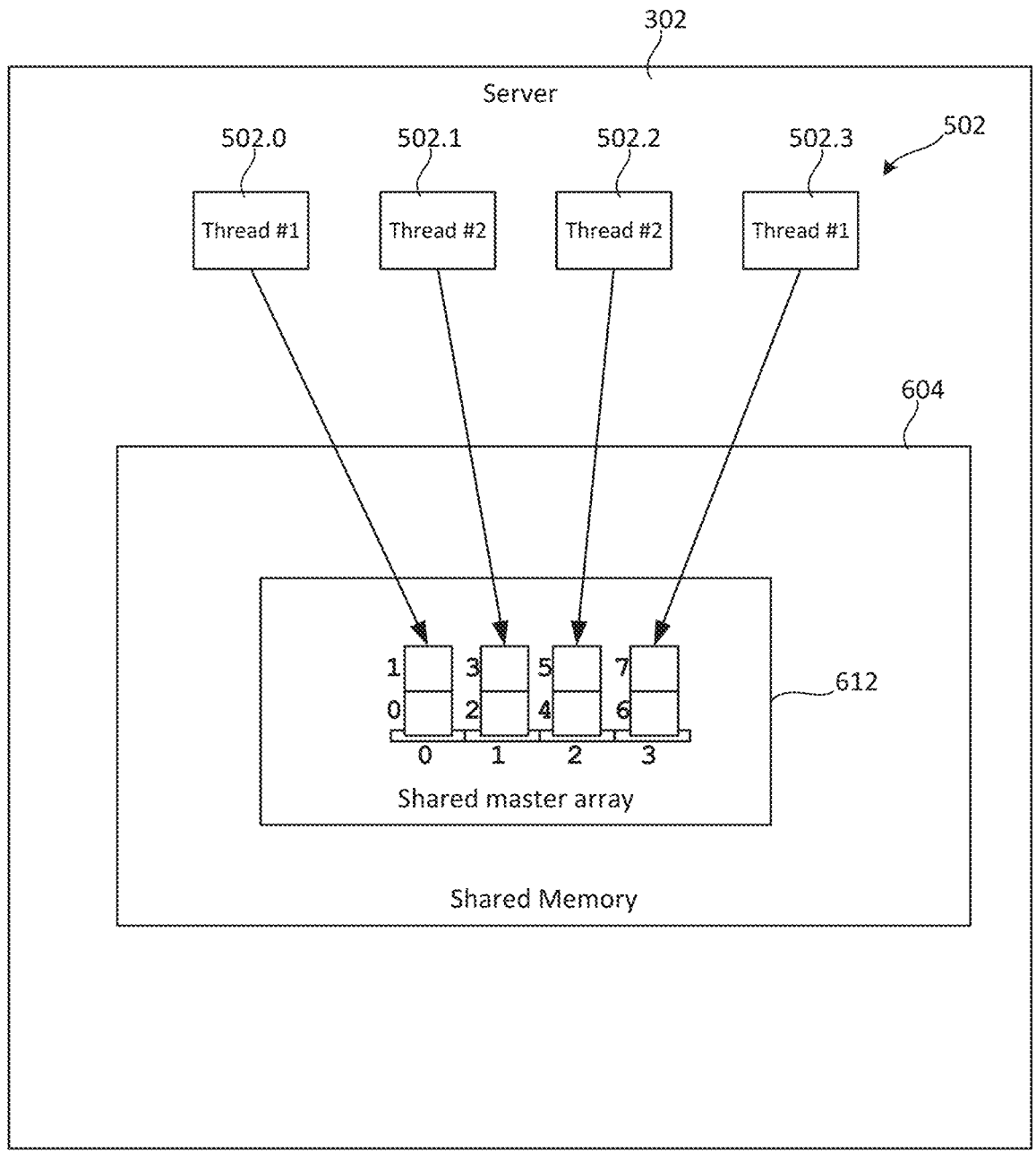
FIG. 6B illustrates a "partitioned" solution for multi-thread count estimation.

Partitioned Solution:

FIG. 6B illustrates an example of what is referred to herein as the "partitioned" solution. At each server 302, hash buckets owned by different threads are "partitioned" in the following sense.

Similar to the shared solution, a shared counting object 612 is created in shared memory 604, which is shared between threads. However, whereas the shared HLL object 602 of the shared solution is a simple array, the shared counting object 612 of the shared solution is an array of arrays.

This "array-of-arrays" type data structure is referred to herein as an HLL' (HLL prime) object, and is described in more detail later with reference to FIG. 9A.

The outer array of the HLL' is referred to as a master array, and the inner arrays as partitioned arrays (columns). There is one column per thread, which contains the hash values for the hash buckets owned by that thread and each column corresponds to a partition owned by that thread. Thus, when the user events are allocated correctly, each thread only accesses one column and no two threads access the same column. Thus in the example of FIG. 6B there are four columns in the master array—one for each of the four threads.

The shared and partitioned solutions may not be strictly thread safe. However, collisions between threads are prevented by accurately allocating the user events to the threads.

Virtualized Solution

A variant of the partitioned solution is referred to herein as the "virtualized" solution.

Whereas the partitioned solution has a single set of partitions shared among all threads, in the virtualized solution each thread is given its own (full) set of partitions. However, each thread only ever writes to one of its partitions—the others remain empty. It is "virtualized" in the sense that, although each thread only writes to one partition, the other partitions still exist, albeit empty, to allow a correct calculation of the partition. That is, an array-of-arrays HLL' object is created for each thread, with one column per thread, however only one of those columns is actually written to—the others remain empty. The empty partitions do require some memory overhead—to store the partition index for the empty arrays any additional overhead data—however this is minimal, because memory space is only reserved for the columns themselves when hash bucket values actually need to be written to them.

The virtualized solution solves certain problems that arise when HLL objects are grown dynamically, as explained below. However, it also has other benefits that are described later.

Figure 8A:
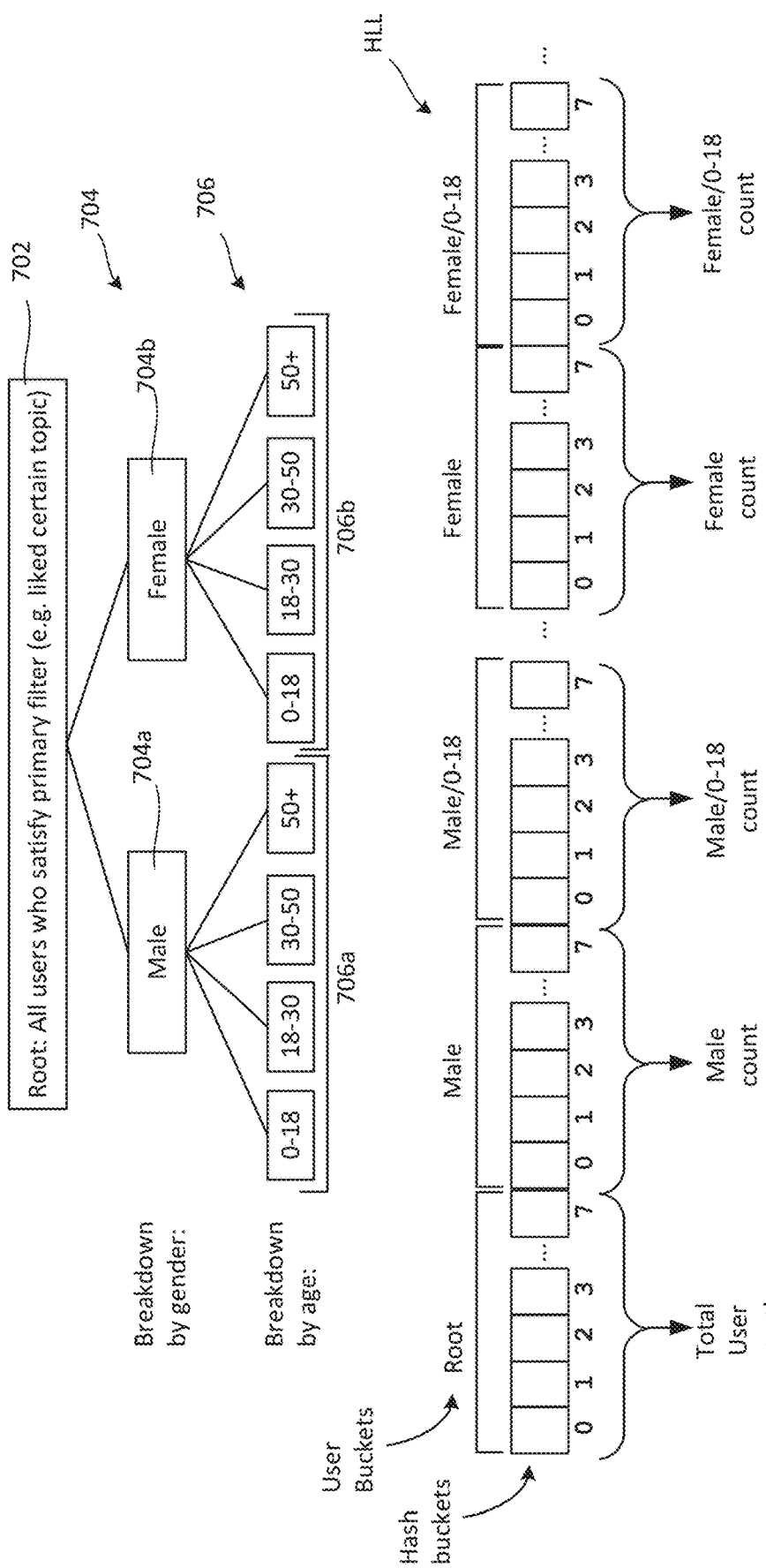
FIG. 8A illustrates a mechanism for dynamically growing a counting object as user buckets are discovered.
Figure 8B:
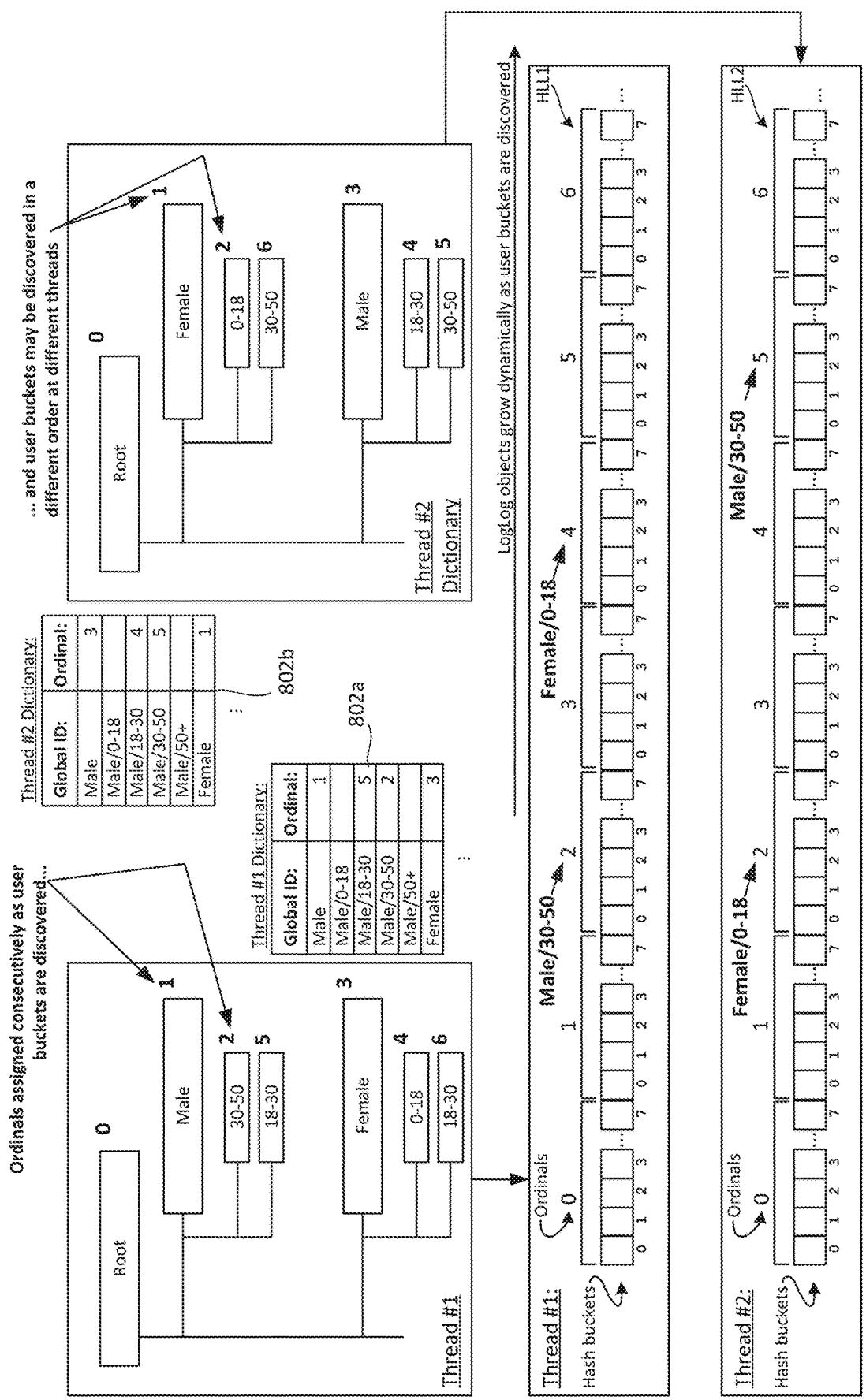
FIG. 8B illustrates how local counting objects can be grown independently by different threads.
Figure 8C:
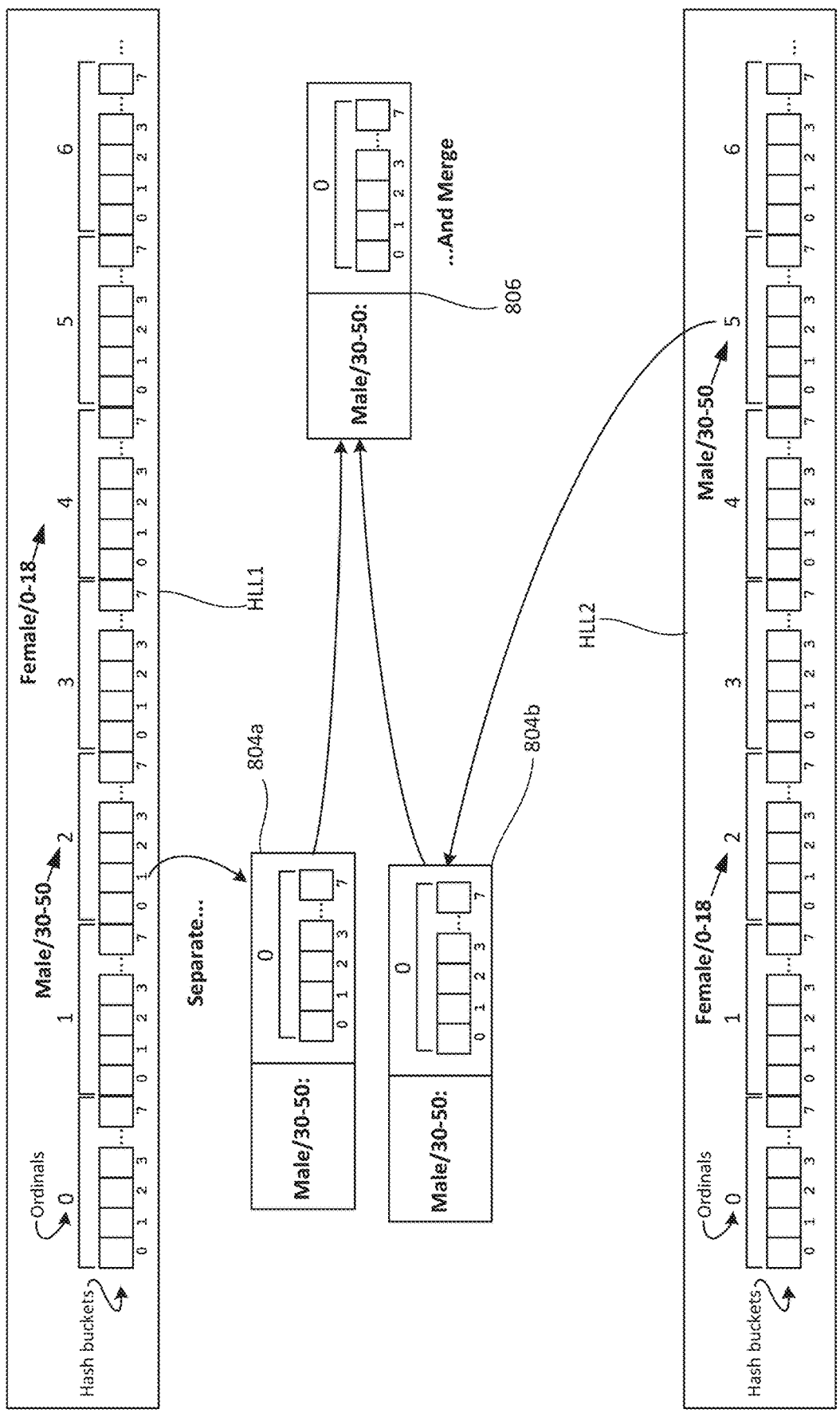
FIG. 8C illustrates how counting objects grown dynamically at different threads can be merged.

Before describing the virtualized solution, some relevant background around dynamically growing HLL objects is provided with reference to FIGS. 8A-C. This applies in the context described above, in which counts are obtained for multiple user buckets.

Dynamically Growing HLLs

FIG. 8A shows a conventional type of HLL object (HLL) for the tree of 700 of FIG. 7. Note only the first two levels of breakdown (age and gender) are considered for simplicity. The HLL object is a simple array having a plurality of entries, with M entries per node of the tree 700, i.e. that number of entries per user bucket (M being the number of hash buckets for each count—see above).

In FIG. 8A, the first M entries hold hash bucket values for the root node 700, the next M entries hold hash bucket values for the male node 704a, the next M*$C_M$ entries hold hash bucket values for the second level children of the male node 706a (where $C_M$ is the number of children of the male node 704a). The next M entries after that hold hash bucket values for the female node 704b, and the final M*$C_F$ entries hold hash bucket values for the second level children of the female node 706b (where $C_F$ is the number of children of the female node 704b).

Whilst this is one possible ordering of the HLL object, when the HLL object is grown dynamically, the ordering of the HLL object is actually determined dynamically as user buckets are "discovered". A user bucket is discovered the first time a user event in that user bucket is encountered.

This will now be described with reference to FIG. 8B.

With dynamic discovery, the very first time a user event is encountered which falls in a particular hash bucket, the HLL object is "grown" to accommodate that user bucket, by adding M entries to the end of the HLL object. The first M entries of the array always hold the hash values for the root node 702 however, after that, the ordering of the hash buckets depends on the order in which the user buckets are discovered. As new user buckets are discovered, they are assigned incrementing ordinals, i.e. the root object is assigned ordinal 0 associated with the first M hash buckets, the next user bucket to be discovered is assigned ordinal 1 associated with the next M hash buckets, the next user bucket is assigned ordinal 2 associated with the next M hash buckets after that etc. Ordinal 0 corresponds to the first M entries of the HLL object, ordinal 1 to the next M entries, ordinal 3 to the next M entries after that etc. Each ordinal is associated, in a dictionary, with an identifier of the user bucket, such as a key (e.g. male, male/0-18, . . . female). That identifier is global in the sense that it is used consistently across threads.

This means that each thread reserves M memory regions to hold the M run length values for a particular count only when a user event contributing to that count is first discovered.

With multiple processing threads dynamically assigning ordinals independently as they discover user buckets in processing the user events allocated to them, different threads may assign different ordinals to a given user bucket. Any given ordinal (other than 0) can be assigned to different user buckets at different threads.

An example is shown in FIG. 8B, which shows first and second HLL objects, labelled HHL1 and HHL2 respectively, generated by first and second threads respectively.

As shown, thread #1 happens to have discovered user buckets in the following order: male, male/30-50, female, female/0-18, male/18-30, female 18-30. Thread #1 has therefore assigned ordinals 1-6 to user buckets as follows:
1. male
2. male/30-50
3. female
4. female/0-18
5. male/18-30
6. female 18-30

Each of these ordinals is associated with the global identifier of the user bucket it is assigned to in a first dictionary 802a maintained by thread #1.

Thread #2 happens to have discovered user buckets in a different order, namely: female, female/0-18, male, male/18-30, male/30-50, female 30-50.

Thread #2 has therefore assigned ordinals 1-6 as follows:
1. female
2. female/0-18
3. male
4. male/18-30
5. male/30-50
6. female 30-50

Each of these ordinals is associated with the global identifier of the user bucket it is assigned to in a second dictionary 802b maintained by thread #2.

This means that, whilst the first M hash buckets of HHL1 and HHL2 are for the root node 702, the next M hash buckets of HLL1 are for the male node 704a whereas the next M hash buckets of HLLs are for the female node 704b etc.

Of course, when it comes to merging HHL1 and HHL2, the correct hash buckets need to be merged together for each user bucket, i.e. the hash buckets for the root note in HLL1 (ordinal 0) need to be merged with the hash buckets for the root node in HLL2 (also ordinal 0), the hash buckets for the male node in HLL1 (ordinal 1) need to be merged with the hash buckets for the male node in HHL2 (ordinal 3), the hash buckets for the female node in HLL1 (ordinal 3) need to be merged with the hash bucket values for the female node in HLL2 (ordinal 1) etc. It is therefore necessary to resolve the ordinals to the global user bucket identifiers, using the dictionaries 802a, 802b, before the merge takes place.

FIG. 8C shows one example of a merge process for merging hash buckets of HLL1 and HLL2. In this example, each of the HLL objects is split into smaller, constituent HLLs, with one constituent HLL for each user bucket that contains only the hash bucket values for that user bucket. This is shown for the male/30-50 user bucket, with a first constituent HLL object 804a containing the hash bucket values from HLL1 for the male/30-50 user bucket (ordinal 2 of HLL1), and a second constituent HLL object 804b containing the hash bucket values from HLL2 for the male/30-50 user bucket (ordinal 5 of HLL2). Each of the constituent HLL objects 804a, 804b is associated with the global identifier of the male/30-50 user bucket by resolving the ordinals at each thread during the merge. These constituent HLLs 804a, 804b can then be safely merged, to create a merged HLL 806 for the male/30-50 user bucket, by taking the maximum value of each hash bucket across the constituent HHLs 804a, 804b being merged. The merged HLL 806 can then be merged, in a similar manner, with corresponding male/30-50 HLL objects generated at different servers, before generating a final count.

Such dynamic techniques present challenges for the shared and partitioned solutions described above, because the different threads are not treating ordinals in a consistent manner. The virtualized solution overcomes these challenges, as will now be described.

Figure 9A:
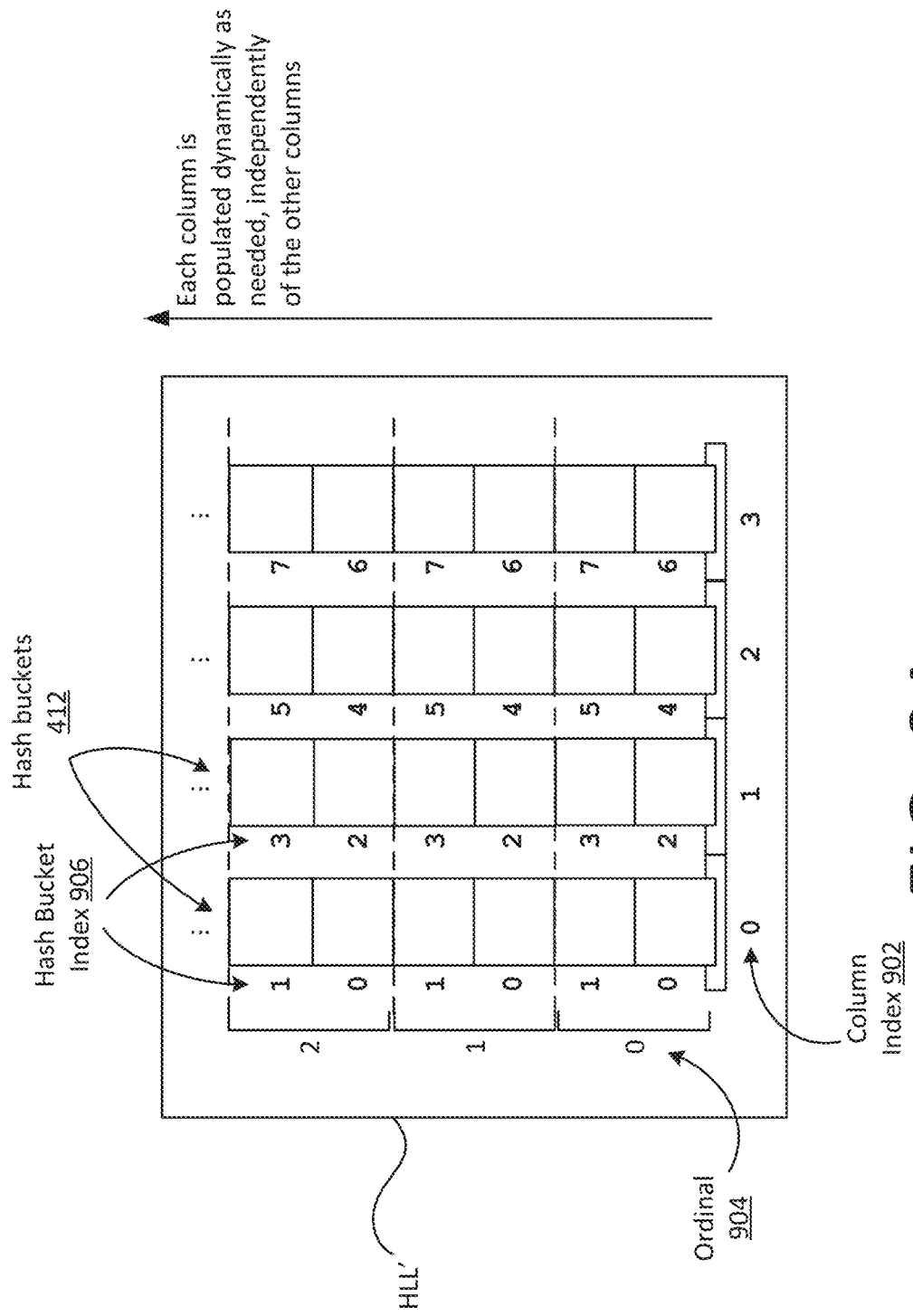
FIG. 9A shows a novel form of counting object (HLL'), which is an array of arrays.

FIG. 9A shows an HLL' object (labelled HLL') of the kind described above, which is used to implement the virtualized solution. The HLL' object is an array of arrays. That is, a master array (shown running horizontally in FIG. 9A), wherein each element of the master array is itself a partitioned array (column).

The HLL' object can be implemented in Java, as an array of array-type objects. At the hardware level, it is implemented as an array of pointers, where each pointer points to one of the column arrays. That is to a partition object for that column, which can contain the actual array of (byte) values or pointers to those values.

Each column is indexed by a respective column (partition) index 902, with one column per thread. At the physical level, the column index 902 is associated with the pointer to that column in the master array. In FIG. 4, four column indexes 0, 1, 2, 3 are shown, corresponding to threads 502.0-502.3 respectively. Each column has a set of container elements 412 for the hash buckets owned by that thread, for each of the counts being generated, where each container element holds the run length value for the hash bucket it corresponds to. Thus column 0 has container elements 412 for hash buckets 0 and 1, for each user bucket that needs to be counted; column 1 has container elements for hash buckets 2 and 3 for each user bucket etc.

As in FIGS. 8A-C, each user bucket is represented by a (local) ordinal that is associated with a (global) key for that user bucket (e.g. Male, Male/0-18, Female etc.) in a separate dictionary.

When generating a set of counts for a set of user buckets, each thread processes the user events assigned to and when it determines that a user event falls in one of the user buckets, it updates the HLL' object as follows:

it determines the appropriate column index 902 by applying a function to the bucket index portion of the hashed ID, where the function accounts for the number of hash buckets known to be allocated to each thread. In the example of FIG. 9A, this is straightforward: each thread is allocated two buckets, therefore the thread can simply determine the column index as:
0 if the bucket index portion is 000 or 001
1 if the bucket index portion is 010 or 011
2 if the bucket index portion is 100 or 101
3 if the bucket index portion is 110 or 111 it determines which entry in the column to go to from the same hash bucket index portion, and also from the ordinal of the user bucket.

So, for example, when a thread determines that a user event with hashed ID 110 . . . falls in user bucket with ordinal 3, it would select hash bucket 6=110 for ordinal 3 in column 3.

Similar to FIGS. 8A-C, the ordinals are assigned dynamically as new user buckets are discovered at the thread in question, whereby a user bucket key may be associated with different ordinals at different threads when those threads, as those threads may discover the user buckets in different orders. Memory is likewise only reserved as new buckets are discovered so that the size of HLL' object increases dynamically as more user buckets are discovered. However, where the present approach differs is that the columns are grown independently of each other. Thus when the very first user event in a user bucket is discovered, the user bucket is assigned the next available ordinal at that point. However, only the column denoted by that user' events hashed ID is grown, e.g. is that user events hashed ID happens to start 010=bucket index 2, only column 1 is grown at that point. It is, however, grown by adding container elements for all of the hash buckets associated with that column, so in this example, an element is added not only for bucket index 2 but also for bucket index 3.

Essentially, when the first new user event is discovered for an ordinal, the hash buckets for that ordinal don't exist and therefore need to be created. Since the number of hash buckets per ordinal for a given thread is fixed, that number can be allocated for the ordinal, with each hash bucket initialized to zero, once the system has discovered that the ordinal exists.

The number of hash buckets per ordinal is known in advance (because it's derived from the precision parameter of the HLL), but number of ordinal buckets is unknown because the number of ordinals is unknown and has to be dynamically discovered.

Figure 9B:
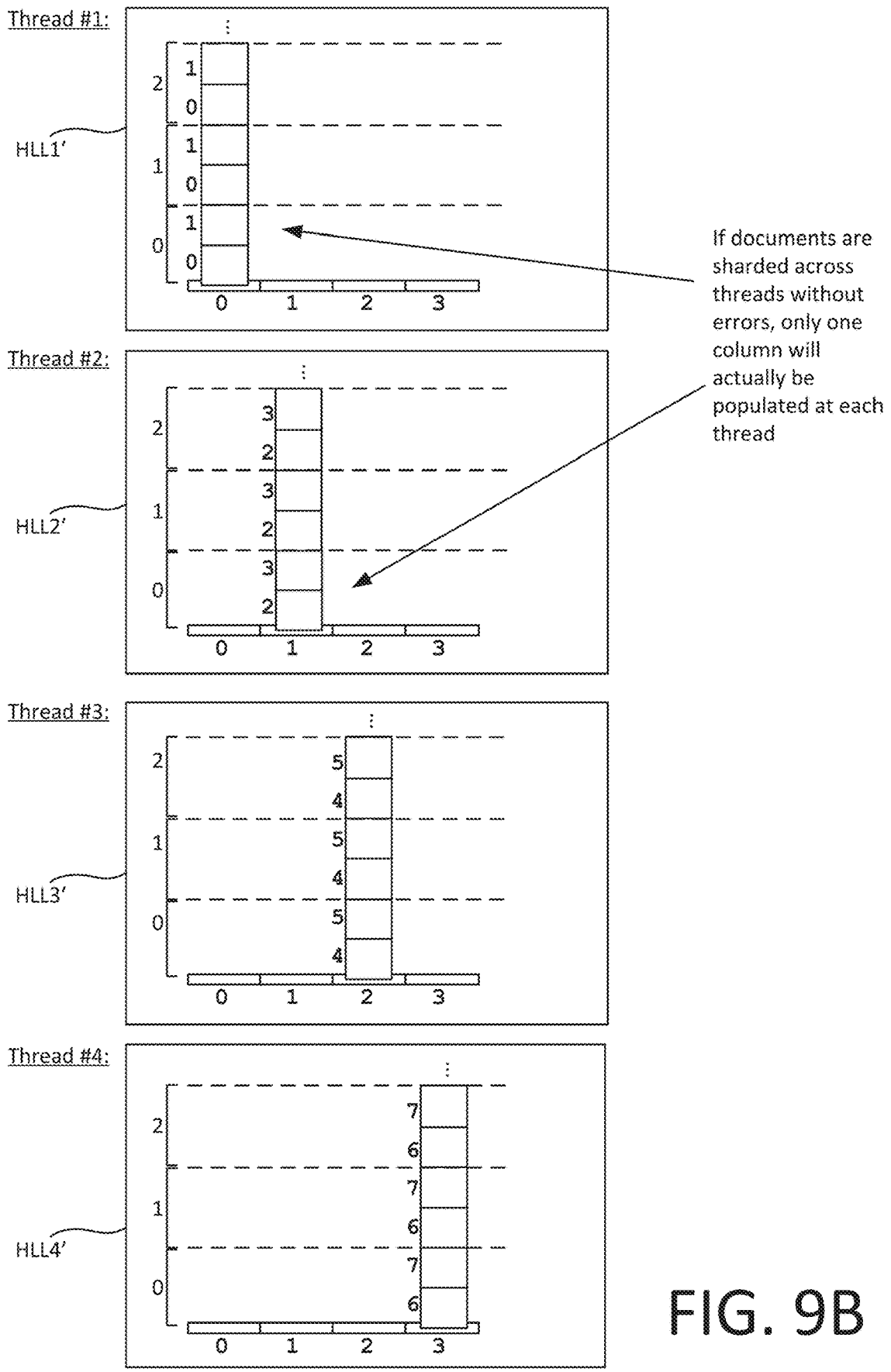
FIG. 9B shows how local HLL' objects can be grown dynamically by different threads.

With reference to FIG. 9B—which shows HLL' objects for threads 1 to 4, labelled HLL1' to HLL4' respectively—it is also important to note that, when the user events are shaded across threads as in FIG. 5A, without any errors, each thread will only ever grow one column of its HLL' object, namely the column containing the values for the hash buckets owned by that thread—the other elements in the horizontal array will remain empty because there should not be any user events assigned to that thread that fall any of the hash buckets associated with those columns. However, allowing the thread to grow the other columns if it needs to provides robustness to errors: if an event is wrongly allocated, this can result in one thread growing multiple columns. However, this will not affect the final result. This does increase the size of the HLL' object, within a resulting performance penalty in terms of memory usage. However if the number of errors is small, the effect is minor. The virtualized solution is thread safe, in that such errors cannot cause collisions between different threads as they are always writing to different HLL' objects.

Ordinals are assigned independently on each thread. Since (with no errors) each thread will claim exactly one partition (column), each columns ordinals will be assigned independently. Ordinals are also assigned sequentially, whenever a new bucket value is discovered. As a consequence, every ordinal less than the current ordinal will have seen at least one object previously.

As noted, in the virtualized solution, a full HLL' object is created for each thread, which is maintained by that thread independently of the other thread(s). Each thread assigns ordinals independently as it discovers user events, and there is no requirement for ordinals to be used consistently across the HLL' objects maintained by different threads. This is because the ordinals are resolved to global identifiers (uses consistently across threads) before the HLL' objects are merged.

Figure 9C:
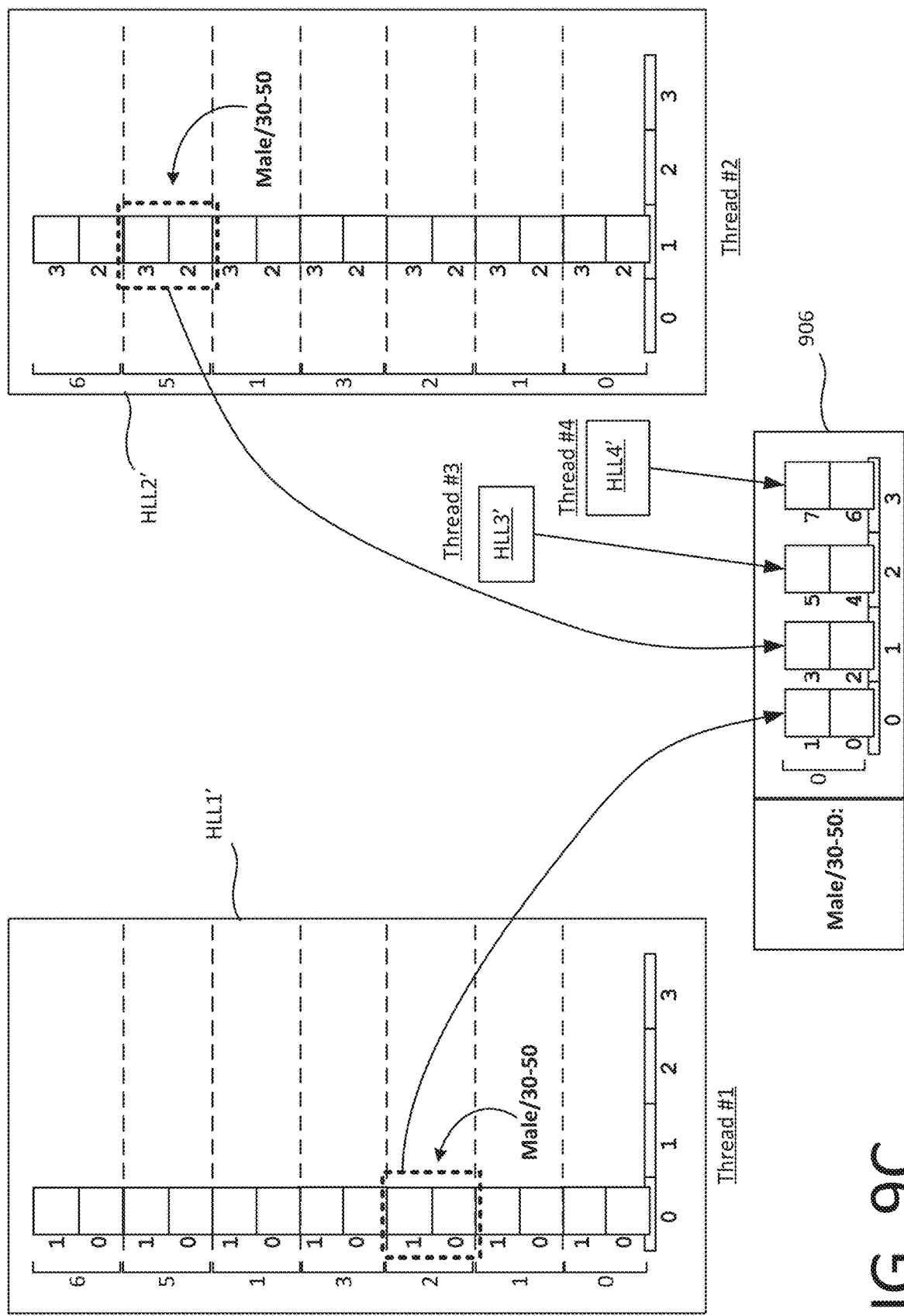
FIG. 9C shows how local HLL' objects grown dynamically by different threads can be merged.

FIG. 9C illustrates how two such HLL' objects from different threads—labelled HLL1' and HLL2' respectively—can be merged according to the same principles as described in relation to FIG. 8C above. As in FIG. 8C, one merged HLL' object is created for each user bucket, and a merged HLL' object 906 is shown for the male/30-50 user bucket by way of example. This is generated by resolving ordinals 2 and 5 at thread #1 and thread #2 respectively to the global ID of the male/30-50 user bucket. The merged HLL' object 906 is analogous to the merged HLL object 806 of FIG. 8C.

In FIG. 9C, the merge operation of FIG. 8C is effectively performed separately for each column index. That is, column 0 of the merged object 906 is generated by merging column 0 across all threads as per FIG. 8C. Similarly, columns 2, 3 and 4 of the merged HLL' 906 are generated by merging columns 2, 3 and 4 respectively across all threads. The merge operation takes the maximum of value of each hash bucket across the HLL' objects being merged.

As noted, if the user events are allocated without errors, only one column will be populated at each thread—the others will be empty. This does not affect the merge operation—it will simply "ignore" the empty columns, and the maximum hash bucket value will therefore always be the value of whichever column is populated. On the other hand, if errors do result in a few of the user events being allocated to the wrong processing thread, resulting in a particular column being populated at more than one thread, this has no adverse effect on the outcome of the merge operation—in this case the two non-empty columns are merged correctly by taking the maximum value of each hash bucket in these columns.

Figure 9D:
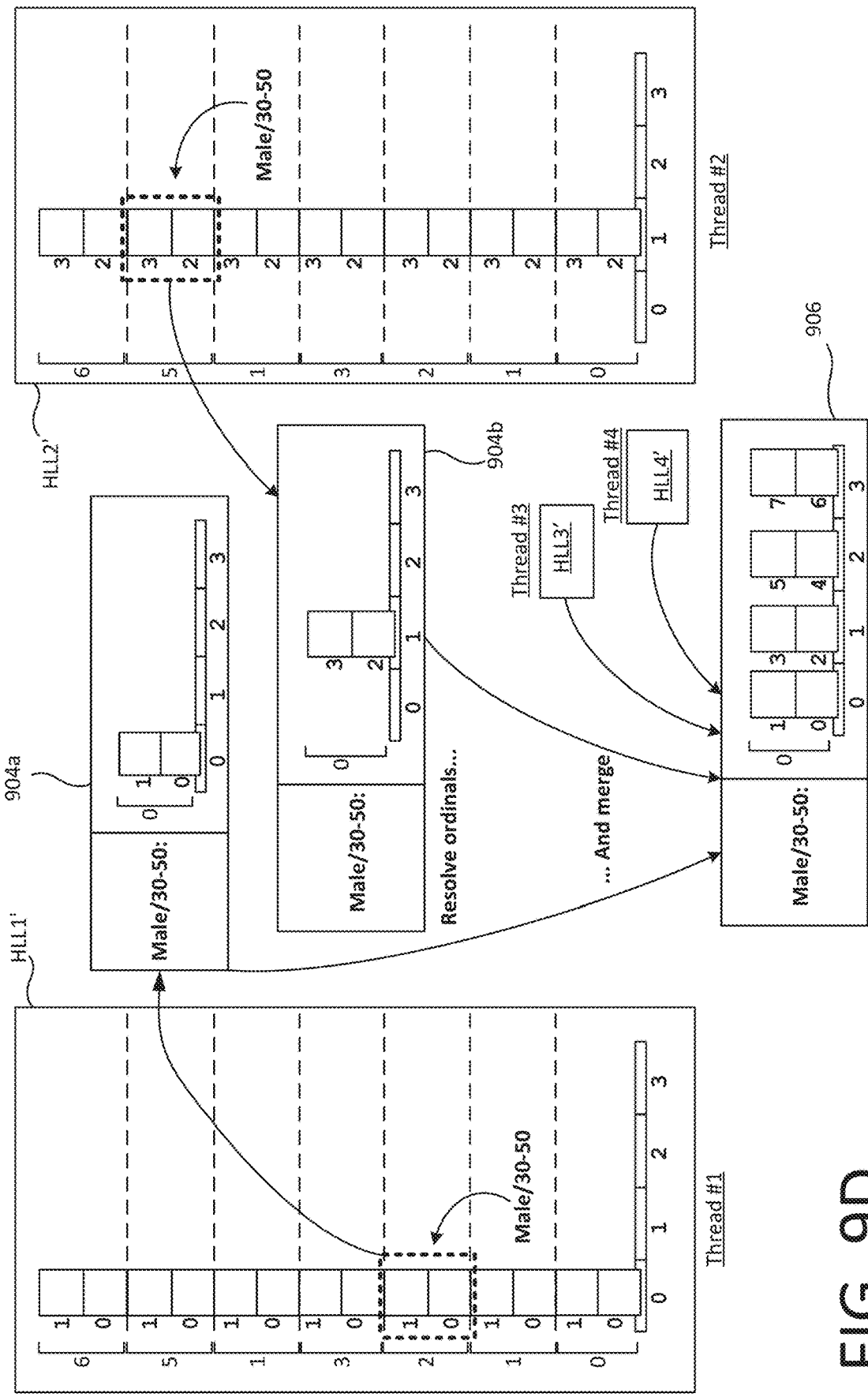
FIG. 9D shows further details of a possible merge operation for HLL' objects.

FIG. 9D shows further details of a possible merge operation. The HLL' objects from different threads HLL1', HLL2'; are "split" at the start of the merge into constituent HLL' objects 904a, 904b, which is analogous to the splitting of the HLL array objects of FIG. 8C into constituent arrays 804a, 804b. However, here the result of the spilt is one merged HLL' 906 for each ordinal at each thread. This is shown in FIG. 9D for the male/30-50 user bucket, assigned ordinal 2 at thread #1 and ordinal 5 at thread #2. These ordinals are resolved to the global ID for that user bucket, and the constituent HLL' objects associated with the same global ID can be safely merged.

The key thing here is that, since the ordinals for the same bucket might be different across different threads, they need to be resolved them first: this is done at the "splitting" stage. Once the ordinals are resolved, each set of HLL' objects obtained for each bucket can be merged in to one, leaving a single HLL' per demographic bucket.

API:

The generating of the HLL objects and the subsequent merge process can be handled by an API, which maintains the dictionaries as it grows the HLLs at each thread, and which has a merge function configured to perform the merge process described above with reference to FIG. 8C. As is evident, the dictionaries are needed to merge HLLs from different threads, because without them there is no way to resolve the ordinals at each thread to the global user bucket IDS. Such an API—which resolves the ordinals as part of the merge function—may not provide any visibility of the dictionaries themselves, which means that the only way to perform the merge is to use the merge function of the API itself. It is not possible to implement an external merge function because this would require access to the dictionaries. Thus merges across threads can only be performed as flexibility as the merge function of the API allows.

A benefit of the virtualized solution mentioned above is that it can be implemented within the confines of such an API, by applying the merge function to the HLL' objects, without requiring external access to the dictionaries. Arranging the hash buckets into columns in the HLL' objects effectively forces the merge function of the API to perform the merge operation separately on each column.

Relative Performance Benefits of the Different Solutions:

In addition to the benefits of the virtualized solution set out above, it also has performance benefits compared with the shared and partitioned solutions, as it reduces the extent to which false sharing of cache lines takes place. Benchmarking test have shown the partitioned and virtualized solutions to have better performance in this respect than the shared solution, and have also shown the virtualized solution to perform better than the partitioned solution.

A CPU cache is a hardware cache that can reduce memory access times, by caching data from main memory. Typically, whenever data is read from a location in the main memory, a fixed-size block of data around that location is cached. These blocks are called "cache lines", and a cache line size of 64 bytes is common. To maintain cache coherence, it can be necessary to invalidate a cache line, forcing the data of the cache to be re-loaded from main memory if it is needed again. For example, with multiple CPU cores having access to shared memory, each with its own CPU cache, the same cache line can end up being cached simultaneously in different caches. To ensure cache coherence, whenever one CPU core writes to any part of a cache line in its own cache, typically the whole cache line is invalidated in the caches of the other CPU cores. This means that, whenever a CPU core writes to a cache line, all of the other CPU cores have to discard their own cached copies and re-load the entire cache line from the main memory.

For the shared solution, parts of the array 602 owned by different threads can end up within the same cache line. This means that, even though each part of the array 602 is only every written to by one thread, a write by one thread can invalidate a cache line that happens to contain part of the array 602 owned by another thread, thereby invalidating the cache line for the other thread and forcing it to re-load the cache line from the shared memory. This is referred to as false sharing of cache lines, and the partitioned solution can also suffer from the same problems, albeit to a somewhat lesser extent.

With the virtualized solution, it is possible to eliminate, or at least significantly reduce, the number of cache line invalidations that occur, by avoiding the use of a shared counting object. For example, it is possible to implement the virtualized solution such that cache line invalidations only occur when columns are added, which gives an acceptable level of performance, and further improvements may also be possible.

Whist in the above, the user events relate to social interactions on a social media platform (publishing/consuming content), the invention is not limited in this respect and the system can be used for processing other types of events on any platform with a user base that facilitates user actions. The platform provider could for example be a telecoms operator like Vodafone or Verizon, a car-hire/ride-share platform like Uber, an online market place like Amazon, a platform for managing medical records. The events can for example be records of calls, car rides, financial transactions, changes to medical records etc. conducted, arranged or performed via the platform. There are numerous scenarios in which it is beneficial to extract anonymous and aggregated information from such events, where the need to obtain a user count over a set of such events arises. In this context, each event can be any event relating to the user with which it is associated. Each of the user events may relate to an action performed by or otherwise relating to one of the users of a platform and comprise an identifier of that user. That is, each of the user events may be a record of a user-related action on the platform.

In this respect, it is noted that all description pertaining to interaction events of a social media platform (content items) herein applies equally to other types of events of platforms other than social media. Such events can comprise or be associated with user attributes and/or metadata for the actions to which they relate, allowing those events to be processed (e.g. filtered and/or aggregated) using any of the techniques described herein.

It will be appreciated that the above embodiments have been described only by way of example. Other variations and applications of the present invention will be apparent to the person skilled in the art in view of the disclosure given herein. The present invention is not limited by the described embodiments, but only by the appendant claims.

The invention claimed is:

1. A method of processing user events to estimate a unique user count, each of the user events having a user identifier, the method comprising:
generating an identifier hash for each of the user events by applying a hash function to the user identifier of the user event, the identifier hash having: (i) a bucket index portion denoting one of a plurality hash buckets, and (ii) a second portion for estimating the unique user count;
at a processing node, allocating each of the user events to one of a plurality of processing threads of the processing node based on the bucket index portion of its identifier hash;
receiving a query relating to the user events; and
estimating at least one unique user count for the query by implementing the following steps:
at the processing node, reserving a memory region for each of the hash buckets for storing values of the hash buckets at the processing node;
processing, by each of the processing threads, each of the user events currently allocated to it, to determine whether the user event satisfies at least one parameter of the query, and if so:
1) determining a run length of the second portion of its identifier hash of the user event, the run length being determined as a count of bits, within the second portion of the identifier hash, which match a predetermined bit sequence,
2) comparing, with the determined run length, a maximum run length value, stored at the processing node, of the hash bucket denoted by the bucket index portion of that identifier hash, and
3) if the determined run length is greater than the maximum run length value of that hash bucket at that node, increasing the maximum run length value to match the determined run length; and
using the maximum run length values of the hash buckets to estimate the unique user count, wherein the user events are allocated to the processing threads in dependence on the bucket index portions of the identifier hashes, and the unique user count is estimated in dependence on the second portions of those same identifier hashes.

2. A method according to claim 1, wherein a unique user count is estimated for each of a plurality of user buckets indicated by the query, said steps being implemented for each of the user buckets to generate the unique user count for that user bucket with the processing step being performed to determine whether that user event falls in that user bucket.

3. A method according to claim 2, wherein the memory regions are reserved dynamically for the user buckets at the processing node as the user buckets are discovered, each user bucket being discovered the first time a user event falling in that user bucket is encountered.

4. A method according to claim 3, wherein ordinals are dynamically assigned to the user buckets as the user buckets are discovered, the ordinal assigned to a user bucket being associated with the memory regions reserved for that user bucket.

5. A method according to claim 4, wherein each processing thread dynamically assigns ordinals to the user buckets independently of the other processing thread(s).

6. A method according to claim 3, wherein at least one array of container elements is created in memory at the processing node for holding the maximum run length values, wherein the memory regions are reserved dynamically in the memory by adding new container elements to the at least one array to grow the at least one array as the user buckets are discovered.

7. A method according to claim 6, wherein at least one master array is created in memory at the processing node, the master array being an array of partitioned arrays, each of the partitioned arrays being an array of container elements for holding maximum run length values of a subset of the hash buckets;

wherein, at each processing thread, each time a user bucket is discovered, the processing thread selects one of the partitioned arrays in the master array based on the bucket index portion of that user event's identifier hash, the maximum run length value of the hash bucket denoted by the bucket index portion of that identifier hash being stored in the selected partitioned array.

8. A method according to claim 7, wherein each of the partitioned arrays has a partition index within the master array, wherein the partitioned array is selected by applying a function to the bucket index portion of the user event's identifier hash to determine the partition index of the selected partition array in the master array.

9. A method according to claim 7, wherein the memory regions are reserved dynamically for the user buckets by growing the partitioned arrays as the user buckets are discovered, the partitioned arrays being grown by:

each time a user bucket is discovered, selecting one of the partitioned arrays for growing based on the bucket index portion of the identifier hash of the first user event encountered in that user bucket and growing that selected partitioned array by adding at least one new container element to it.

10. A method according to claim 9, wherein each processing thread creates its own local master array of partitioned arrays, which that processing thread grows independently of the other processing thread(s) as it discovers user buckets in processing the user events currently allocated to it.

11. A method according to claim 10, wherein each processing thread dynamically assigns ordinals to the user buckets as it discovers them, independently of the other processing thread(s).

12. A method according to claim 10, wherein the local master arrays are merged to generate at least one merged array of arrays, which is used to estimate the unique user counts for the user buckets.

13. A method according to claim 7, wherein the master array of partitioned arrays is shared between the processing threads.

14. A method according to claim 6, wherein the array is a shared array shared between the processing threads.

15. An event processing system comprising:

at least one processing node configured to receive user events and allocate each of those user events to one of a plurality of processing threads of the processing node based on a bucket index portion of an identifier hash generated for that user event, the bucket index portion denoting one of a plurality hash buckets;

a hashing component configured to generate the identifier hash for each of the user events by applying a hash function to a user identifier of that user event;

a query handler configured to receive a query relating to the user events; and wherein the event processing system is configured to estimate at least one unique user count for the query by implementing the following steps:

at the processing node, reserving a memory region for each of the hash buckets for storing values of the hash buckets at the processing node;

processing, by each of the processing threads, each of the user events currently allocated to it, to determine whether the user event satisfies at least one parameter of the query, and if so:

1) determining a run length of a second portion of its identifier hash, the run length being determined as a count of bits, within the second portion of the identifier hash, which match a predetermined bit sequence, 2) comparing, with the determined run length, a maximum run length value, stored at the processing node, of the hash bucket denoted by the bucket index portion of that identifier hash, and 3) if the determined run length is greater than the maximum run length value of that hash bucket at that node, increasing the maximum run length value to match the determined run length; and using the maximum run length values of hash buckets to estimate the unique user count, wherein the user events are allocated to the processing threads in dependence on the bucket index portions of the identifier hashes, and the unique user count is estimated in dependence on the second portions of those same identifier hashes.

16. A computer program product stored in a non-transitory computer readable storage medium for processing user events to estimate a unique user count, each of the user events having a user identifier, the computer program product comprising computer readable instructions stored in computer readable storage, which are configured, when executed, to perform operations of:

generating an identifier hash for each of the user events by applying a hash function to the user identifier of the user event, the identifier hash having a (i) bucket index portion denoting one of a plurality hash buckets, and (ii) a second portion for estimating the unique user count;

at a processing node, allocating each of the user events to one of a plurality of processing threads of the processing node based on the bucket index portion of its identifier hash;

receiving a query relating to the user events; and estimating at least one unique user count for the query by implementing the following steps:

at the processing node, reserving a memory region for each of the hash buckets for storing values of the hash buckets at the processing node;

processing, by each of the processing threads, each of the user events currently allocated to it, to determine whether the user event satisfies at least one parameter of the query, and if so:

1) determining a run length of a second portion of its identifier hash, the run length being determined as a count of bits, within the second portion of the identifier hash, which match a predetermined bit sequence, 2) comparing, with the determined run length, a maximum run length value, stored at the processing node, of the hash bucket denoted by the bucket index portion of that identifier hash, and 3) if the determined run length is greater than the maximum run length value of that hash bucket at that node, increasing the maximum run length value to match the determined run length; and using the maximum run length values of the hash buckets to estimate the unique user count, wherein the user events are allocated to the processing threads in dependence on the bucket index portions of the identifier hashes, and the unique user count is estimated in dependence on the second portions of those same identifier hashes.

17. A method of processing user events to estimate a unique user count, the method comprising:
- receiving the user events at a data processing stage, each of the user events having a user identifier;
- routing each of the received user events to one of a plurality of processing nodes of the data processing stage;
- generating an identifier hash for each of the user events by applying a hash function to the user identifier of the user event, the identifier hash having: (i) a bucket index portion denoting one of a plurality hash buckets, and (ii) a second portion for estimating the unique user count;
- at each processing node, allocating each of the user events to one of a plurality of processing threads of the processing node based on the bucket index portion of its identifier hash;
- receiving a query relating to the user events; and
- estimating at least one unique user count for the query by implementing the following steps:
  - at each processing node, reserving a memory region for each of the hash buckets for storing values of the hash buckets at that processing node;
  - processing, by each of the processing threads of each of the processing nodes, each of the user events currently allocated to it, to determine whether the user event satisfies at least one parameter of the query, and if so:
    1) determining a run length of the second portion of its identifier hash, the run length being determined as a count of bits, within the second portion of the identifier hash, which match a predetermined bit sequence,
    2) comparing, with the determined run length, a maximum run length value, stored at that processing node, of the hash bucket denoted by the bucket index portion of that identifier hash, and
    3) if the determined run length is greater than the maximum run length value of that hash bucket value at that processing node to match the determined run length; and
  - using the maximum run length values of the hash buckets to estimate the unique user count, wherein the user events are allocated to the processing threads in dependence on the bucket index portions of the identifier hashes, and the unique user count is estimated in dependence on the second portions of those same identifier hashes.

18. A method according to claim 17, wherein the user events are routed to the processing nodes independently of the identifier hashes, whereby user events received at the data processing stage having matching identifier hashes may be routed to different processing nodes.

19. The method of claim 1, wherein the count of bits which match a predetermined bit sequence is a count of leading zero-valued bits within the second portion of the identifier hash.

* * * * *